(12) United States Patent
Brook

(10) Patent No.: US 7,281,205 B2
(45) Date of Patent: Oct. 9, 2007

(54) HASH COMPACT XML PARSER

(75) Inventor: John Charles Brook, Stanhope Gardens (AU)

(73) Assignee: Canon Kabushiki Kaisha, Tokyo (JP)

(*) Notice: Subject to any disclaimer, the term of this patent is extended or adjusted under 35 U.S.C. 154(b) by 1095 days.

(21) Appl. No.: 09/893,645

(22) Filed: Jun. 29, 2001

(65) Prior Publication Data

US 2002/0038320 A1 Mar. 28, 2002

(30) Foreign Application Priority Data

Jun. 30, 2000 (AU) .................... PQ8495

(51) Int. Cl.
G06F 15/00 (2006.01)
(52) U.S. Cl. .............. 715/513; 715/513; 705/50
(58) Field of Classification Search ............ 715/13, 715/513; 707/3
See application file for complete search history.

(56) References Cited

U.S. PATENT DOCUMENTS

| 5,680,622 A | 10/1997 | Even ............... 395/709 |
| 6,635,088 B1* | 10/2003 | Hind et al. .......... 715/513 |
| 6,785,673 B1* | 8/2004 | Fernandez et al. ...... 707/3 |
| 6,883,137 B1* | 4/2005 | Girardot et al. ...... 715/513 |

FOREIGN PATENT DOCUMENTS

JP 10-312395 11/1998

OTHER PUBLICATIONS

"Information Technology—Universal Multiple-Octet Coded Character Set (USC)—Part 1: Architecture and Basic Multilingual Plane, Amendment 1: Transformation Format for 16 Planes of Group 00 (UTF-16)," International Standard ISO/IEC 10646-1 (First Edition May 1, 1993, Amendment 1 Oct. 15, 1996), Contents pp. ii, iii, iv; pp. 1-6.
"Extensible Markup Language (XML) 1.0 (Second Edition)," W3C Recommendation Oct. 6, 2000.

* cited by examiner

*Primary Examiner*—Doug Hutton
*Assistant Examiner*—Quoc A. Tran
(74) *Attorney, Agent, or Firm*—Fitzpatrick, Cella, Harper & Scinto

(57) ABSTRACT

A method of parsing a markup language document comprising syntactic elements is disclosed, said method comprising, for one of said syntactic elements, the steps of identifying (310) a type of the element, processing (318) the element by determining a hash representation thereof if said type is a first type, and augmenting (314) an at least partial structural representation of the document using the hash representation if said type is said first type.

26 Claims, 9 Drawing Sheets

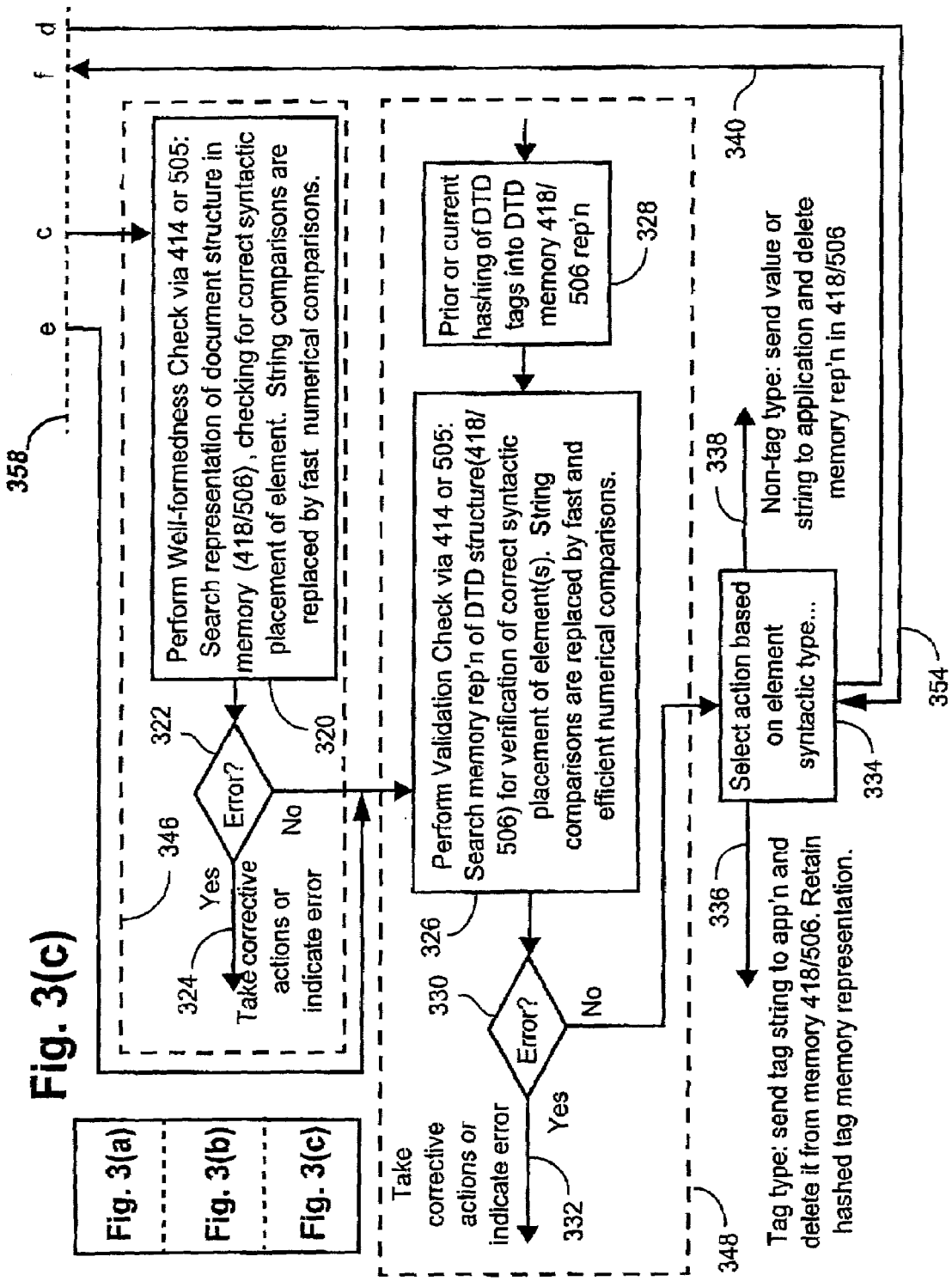

HASH COMPACT XML PARSER

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates generally to processing of multimedia documents, and, in particular, to documents produced in mark-up language. The present invention relates to a method and apparatus for parsing documents in mark-up language. The invention also relates to a computer program and a computer program product including a computer readable medium having recorded thereon said computer program, which is configured to make a computer execute a procedure for parsing a document composed in a mark-up language.

BACKGROUND ART

Parsing is a process of extracting information from a document. The process usually involves at least a minimum check of document syntax, and can in general yield either a tree structure description of the document, or a logical chain of events. The structural representation based on the logical chain of events is typically produced by an ordered parsing of the document from beginning to end.

Tree-based parsers compile, for example, an XML document into an internal tree structure, providing a hierarchical model which applications are able to navigate. The Document Object Model (DOM) working group at the World-Wide Web consortium is presently developing a standard tree-based Application Programming Interface (API) for Extended Markup Language (XML) documents. Event-based parsers, on the other hand, report parsing events such as the start and end of elements directly to the application for which the parsing is being performed. This reporting is performed typically using callbacks, and does not require an internal tree structure. The application requiring the parsing implements handlers to deal with the different events, much like handling events in a graphical user interface.

Tree-based parsers are useful for a wide range of applications, but typically place a strain on system resources, particularly if the document being parsed is large. Furthermore, applications sometimes need to build their own particular tree structures, and it is inefficient to build a tree representation, only to map it to a different representation. Event-based parsers provide a simpler, lower-level access to an XML document, facilitating parsing of documents larger than available system memory. The "Simple API for XML" (referred to as the SAX parser) is an event-driven interface for parsing XML documents. SAX parsers are discussed in more detail in relation to FIGS. 2(a), 2(b), 3(a), 3(b) and 3(c).

FIGS. 1(a) and 1(b) shows block representations of parser systems. The following XML document fragment 106 is considered:

```
105 <Shakespeare>
110 <!--This is a comment-->
115 <div class="preface" Name1="value1" name2="value2">
120 <mult list=<> </mult>
```

-continued

```
125 <banquo>
130 Say                                                           [1]
135 <quote>
140 goodnight </quote>,
145 Hamlet.</banquo>
150 <Hamlet><quote>Goodnight, Hamlet. </quote></Hamlet>
155 </Shakespeare>
```

In FIG. 1(b), the XML document 106 is input into a parser 112 which, in the present instance, is an event based parser. Optionally, as indicated by a dashed box 108, a Document-Type-Definition (DTD) or an XML Schema is also input into the parser 112. The parser 112 outputs, as depicted by an arrow 114, a partial structural representation of the document 106 which can be a simple list. In FIG. 1(a), a Cascading Style Sheet (CSS) or an Extendable Style Sheet (XSL) 104 is input into a CSS or XSL parser 110. A DTD 102 can also be input into this parser 110. Both the XML parser 112 and the CSS/XSL parser 110 are event driven parsers in the present illustration.

One of the benefits of mark-up languages such as XML is the facility to make documents smarter, more portable and more powerful, by enabling the use of tags to define various parts of the documents. This capability derives from the descriptive nature of XML. XML documents can be customised on a per-subject basis, and accordingly, customised tags can be used to make the documents comprehensible, in terms of the structure, to a human reader. This very attribute, however, often leads to XML documents being verbose and large, and this poses a problem in some instances. For example, where XML documents must be parsed in a hardware-constrained piece of equipment, such as a printer, the typically memory intensive nature of conventional parsing is in conflict with the limited memory which can be accommodated in such equipment. Furthermore, the human readability of XML documents is typically of minimal benefit when the documents are processed by hardware constrained pieces of equipment. Furthermore, tag-string matching operations, which are required to a significant degree in XML document parsing, pose a sometimes unacceptable burden of processing requirements, translating into an unacceptable number of processor cycles. These problems apply to both parser instances shown in FIGS. 1(a) and 1(b).

DISCLOSURE OF THE INVENTION

It is an object of the present invention to substantially overcome, or at least ameliorate, one or more disadvantages of existing arrangements.

According to a first aspect of the invention, there is provided a method of parsing a markup language document comprising syntactic elements, said method comprising, for one of said syntactic elements, the steps of:

identifying a type of the element;

processing the element by determining a hash representation thereof if said type is a first type; and augmenting an at least partial structural representation of the document using the hash representation if said type is said first type.

According to another aspect of the invention there is provided a method of validating a markup language document against a VRD, said method comprising steps of:

(a) processing the markup language document, for each document tag identified therein, if said document tag is not a first document tag in a corresponding markup language document tag hierarchy, said processing comprising steps of:

(i) determining a hierarchy position of said document tag;

(ii) determining an extended hashed representation of said document tag concatenated with a hashed representation of a previous document tag in the document tag hierarchy; and (iii) storing said extended hashed representation of said document tag if said document tag is more deeply nested than a previous document tag;

(b) processing said VRD, for each tag identified therein, if said tag is not a first tag in a corresponding tag hierarchy, said processing comprising steps of:

(i) determining a hierarchy position of said tag;

(ii) determining an extended hashed representation of said tag concatenated with a hashed representation of a previous tag in the corresponding tag hierarchy; and (iii) storing said extended hashed representation of said tag in a list; and (c) validating said markup language document if said extended hashed representation of said document tag is one of found in said list and is a valid subset of a member of said list.

According to another aspect of the invention there is provided a method of validating a markup language document against a VRD, said method comprising steps of:

(a) processing said VRD, for each structural element identified therein, said processing comprising steps of:

(i) determining syntactic attributes of said structural element;

(ii) determining a hashed representation of said structural element; and (iii) storing said hashed representation and syntactic attributes of said structural element in a structural representation of said VRD; and (b) processing the markup language document, for each document structural element identified therein, said processing comprising steps of:

(i) determining syntactic attributes of said document structural element;

(ii) determining a hashed representation of said document structural element; and (iii) storing said hashed representation and syntactic attributes of said document structural element in a structural representation of the document; and (c) validating said markup language document if syntactic attributes and hashed representations of said each document structural element in the structural representation of the document conforms to corresponding syntactic attributes and hashed representations in said structural representation of said VRD.

According to another aspect of the invention there is provided a method of encoding a markup language document comprising syntactic elements, said method comprising, for one of said syntactic elements, steps of:

identifying a type of the syntactic element; and processing the syntactic element by one of:

(i) determining a hash representation thereof if said type is a first type;

(ii) determining a compressed representation thereof if said type is not a first type; and (iii) retaining the syntactic element.

According to another aspect of the invention there is provided a method of decoding a markup language document comprising encoded syntactic elements, said method comprising, for one of said encoded syntactic elements, steps of:

identifying a type of the encoded syntactic element;

processing the encoded syntactic element by at least one of:

(i) determining all inverse hash representation thereof if said type is a first type; and (ii) determining a decompressed representation thereof if said type is not a first type; and (iii) retaining the encoded syntactic element.

According to another aspect of the invention there is provided an apparatus for parsing a markup language document comprising syntactic elements, said apparatus comprising:

identifying means for identifying a type of the element;

processing means for processing the element by determining a hash representation thereof if said type is a first type; and augmenting means for augmenting an at least partial structural representation of the document using the hash representation if said type is said first type.

According to another aspect of the invention there is provided an apparatus for validating a markup language document against a VRD, said apparatus comprising:

(a) means for processing the markup language document, for each document tag identified therein, if said document tag is not a first document tag in a corresponding markup language document tag hierarchy, said means comprising:

(i) means for determining a hierarchy position of said document tag;

(ii) means for determining an extended hashed representation of said document tag concatenated with a hashed representation of a previous document tag in the document tag hierarchy; and (iii) means for storing said extended hashed representation of said document tag if said document tag is more deeply nested than an extended hashed representation of a previous document tag;

(b) means for processing said VRD, for each tag identified therein, if said tag is not a first tag in a corresponding tag hierarchy, said means comprising:

(i) means for determining a hierarchy position of said tag;

(ii) means for determining an extended hashed representation of said tag concatenated with a hashed representation of a previous tag in the corresponding tag hierarchy; and (iii) means for storing said extended hashed representation of said tag in a list; and (c) means for establishing whether said extended hashed representation of said document tag is one of to be found in said list, and is a valid subset of a member of said list thereby validating said markup language document.

According to another aspect of the invention there is provided an apparatus for validating a markup language document against a VRD, said apparatus comprising:

(a) means for processing said VRD, for each structural element identified therein, said means comprising:

(i) means for determining syntactic attributes of said structural element;

(ii) means for determining a hashed representation of said structural element; and (iii) means for storing said hashed representation and syntactic attributes of said structural element in a structural representation of said VRD; and (b) means for processing the markup language document, for each document structural element identified therein, said means comprising:
  (i) means for determining syntactic attributes of said document structural element;
  (ii) means for determining a hashed representation of said document structural element; and
  (iii) means for storing said hashed representation and syntactic attributes of said document structural element in a structural representation of the document; and
(c) means for comparing syntactic attributes and hashed representations of said each document structural element in the structural representation of the document to corresponding syntactic attributes and hashed representations in said structural representation of said VRD to thereby establish validity of the markup language document.

According to another aspect of the invention there is provided an apparatus for encoding a markup language document comprising syntactic elements, to form an at least partial structural representation of the document, said apparatus comprising:
  means for identifying a type of the syntactic element; and
  means for processing the syntactic element by one of:
    (i) determining a hash representation thereof if said type is a first type;
    (ii) determining a compressed representation thereof if said type is not a first type; and
    (iii) retaining the syntactic element.

According to another aspect of the invention there is provided an apparatus for decoding a markup language document comprising encoded syntactic elements, said apparatus comprising:
  means for identifying a type of the encoded syntactic element;
  means for processing the encoded syntactic element by at least one of:
    (i) determining an inverse hash representation thereof if said type is a first type;
    (ii) determining a decompressed representation thereof if said type is not a first type; and
    (iii) retaining the encoded syntactic element.

According to another aspect of the invention there is provided a computer program which is configured to make a computer execute a procedure to parse a markup language document comprising syntactic elements, said program comprising:
  code for identifying a type of an element;
  code for processing the element by determining a bash representation thereof if said type is a first type; and
  code for augmenting an at least partial structural representation of the document using the hash representation if said type is said first type.

According to another aspect of the invention there is provided a computer program which is configured to make a computer execute a procedure to validate a markup language document against a VRD, said program comprising:
  (a) code for processing the markup language document, for each document tag identified therein, if said document tag is not a first document tag in a corresponding markup language document tag hierarchy, said code comprising:
    (i) code for determining a hierarchy position of said document tag;
    (ii) code for determining an extended hashed representation of said document tag concatenated with a hashed representation of a previous document tag in the document tag hierarchy; and
    (iii) code for storing said extended hashed representation of said document tag if said tag is more deeply nested than a previous document tag;
  (b) code for processing said VRD, for each tag identified therein, if said tag is not a first tag in a corresponding tag hierarchy, said code comprising:
    (i) code for determining a hierarchy position of said tag;
    (ii) code for determining an extended hashed representation of said tag concatenated with a hashed representation of a previous tag in the corresponding tag hierarchy; and
    (iii) code for storing said extended hashed representation of said tag in a list; and
  (c) code for validating said markup language document if said extended hashed representation of said document tag is one of found in said list, and is a valid subset of a member of said list.

According to another aspect of the invention there is provided a computer program which is configured to make a computer execute a procedure to validate a markup language document against a VRD, said program comprising:
  (a) code for processing said VRD, for each structural element identified therein, said code comprising:
    (i) code for determining syntactic attributes of said structural element;
    (ii) code for determining a hashed representation of said structural element; and
    (iii) code for storing said hashed representation and syntactic attributes of said structural element in a structural representation of said VRD; and
  (b) code for processing the markup language document, for each document structural element identified therein, said code comprising:
    (i) code for determining syntactic attributes of said document structural element;
    (ii) code for determining a hashed representation of said document structural element; and
    (iii) code for storing said hashed representation and syntactic attributes of said document structural element in a structural representation of the document; and
  (c) code for validating said markup language document if syntactic attributes and hashed representations of said each document structural element in the structural representation of the document conforms to corresponding syntactic attributes and hashed representations in said structural representation of said VRD.

According to another aspect of the invention there is provided a computer program which is configured to make a computer execute a procedure to encode a markup language document comprising syntactic elements, said program comprising:
  code for identifying a type of the syntactic element; and
  code for processing the syntactic element by one of:
    (i) determining a hash representation thereof if said type is a first type;
    (ii) determining a compressed representation thereof if said type is not a first type; and
    (iii) retaining the syntactic element.

According to another aspect of the invention there is provided a computer program which is configured to make a computer execute a procedure to decode a markup language document comprising encoded syntactic elements, said program comprising:
  code for identifying a type of the encoded syntactic element;

code for processing the encoded syntactic element by at least one of:
- (i) determining an inverse hash representation thereof if said type is a first type; and
- (ii) determining a decompressed representation thereof if said type is not a first type; and
- (iii) retaining the encoded syntactic element.

According to another aspect of the invention there is provided a computer program product including a computer readable medium having recorded thereon a computer program which is configured to make a computer execute a procedure to parse a markup language document, said program comprising:

code for identifying a type of the element;

code for processing the element by determining a hash representation thereof if said type is a first type; and code for augmenting an at least partial structural representation of the document using the hash representation if said type is said first type.

According to another aspect of the invention there is provided a computer program product including a computer readable medium having recorded thereon a computer program which is configured to make a computer execute a procedure to validate a markup language document against a VRD, said program comprising:

(a) code for processing the markup language document, for each document tag identified therein, if said document tag is not a first document tag in a corresponding markup language document tag hierarchy, said code comprising:
- (i) code for determining a hierarchy position of said document tag;
- (ii) code for determining an extended hashed representation of said document tag concatenated with a hashed representation of a previous document tag in the document tag hierarchy; and
- (iii) code for storing said extended hashed representation of said document tag if said document tag is more deeply nested than a previous document tag;

(b) code for processing said VRD, for each tag identified therein, if said tag is not a first tag in a corresponding tag hierarchy, said code comprising:
- (i) code for determining a hierarchy position of said tag;
- (ii) code for determining an extended hashed representation of said tag concatenated with a hashed representation of a previous tag in the corresponding tag hierarchy; and
- (iii) code for storing said extended hashed representation of said tag in a list; and (c) code for validating said markup language document if said extended hashed representation of said document tag is one of found in said list and is a valid subset of a member of said list.

According to another aspect of the invention there is provided a computer program product including a computer readable medium having recorded thereon a computer program which is configured to make a computer execute a procedure to validate a markup language document against a VRD, said program comprising:

(a) code for processing said VRD, for each structural element identified therein, said code comprising:
- (i) code for determining syntactic attributes of said structural element;
- (ii) code for determining a hashed representation of said structural element; and
- (iii) code for storing said hashed representation and syntactic attributes of said structural element in a structural representation of said VRD; and (b) code for processing the markup language document, for each document structural element identified therein, said code comprising:
- (i) code for determining syntactic attributes of said document structural element;
- (ii) code for determining a hashed representation of said document structural element; and
- (iii) code for storing said hashed representation and syntactic attributes of said document structural element in a structural representation of the document; and (c) code for validating said markup language document if syntactic attributes and hashed representations of said each document structural element in the structural representation of the document conforms to corresponding syntactic attributes and hashed representations in said structural representation of said VRD.

According to another aspect of the invention there is provided an at least partial structural representation a markup language document comprising syntactic elements, said at least partial representation having been produced by a method comprising, for one of said syntactic elements, the steps of:

identifying a type of the element;

processing the element by determining a hash representation thereof if said type is a first type; and augmenting an at least partial structural representation of the document using the hash representation if said type is said first type.

According to another aspect of the invention there is provided an apparatus for parsing a markup language document comprising syntactic elements, said apparatus comprising:

a processor;

a memory for storing (i) the document, and (ii) a program which is configured to make the processor execute a procedure to parse the document;

said program comprising:
- (i) code for identifying a type of an element;
- (ii) code for processing the element by determining a hash representation thereof if said type is a first type; and
- (iii) code for augmenting an at least partial structural representation of the document using the bash representation if said type is said first type.

According to another aspect of the invention there is provided an apparatus for validating a markup language document comprising syntactic elements against a VRD comprising syntactic elements, said apparatus comprising:

(a) a processor;

(b) a memory for storing (i) the document, (ii) said VRD, and (iii) a program which is configured to make the processor execute a procedure to validate the document;

(c) said program comprising:

(ca) code for processing the markup language document, for each document tag identified therein, if said document tag is not a first document tag in a corresponding markup language document tag hierarchy, said code comprising:
- (caa) code for determining a hierarchy position of said document tag;
- (cab) code for determining an extended hashed representation of said document tag concatenated with a hashed representation of a previous document tag in the document tag hierarchy; and
- (cac) code for storing said extended hashed representation of said document tag if said document tag is more deeply nested than a previous document tag;

(cb) code for processing said VRD, for each tag identified therein, if said tag is not a first tag in a corresponding tag hierarchy, said means comprising:

(cba) code for determining a hierarchy position of said tag;

(cbb) code for determining an extended hashed representation of said tag concatenated with a hashed representation of a previous tag in the corresponding tag hierarchy; and (cbc) code for storing said extended hashed representation of said tag in a list; and (cc) code for establishing whether said extended hashed representation of said document tag is one of to be found in said list, and is a valid subset of a member of said list, thereby validating said markup language document.

According to another aspect of the invention there is provided an apparatus for validating a markup language document containing syntactic elements against a VRD containing syntactic elements, said apparatus comprising:

(a) a processor;

(b) a memory for storing (i) the document, (ii) said VRD, and (iii) a program which is configured to make the processor execute a procedure to validate the document;

(c) said program comprising:

(ca) code for processing said VRD, for each structural element identified therein, said code comprising:

(caa) code for determining syntactic attributes of said structural element;

(cab) code for determining a hashed representation of said structural element; and (cac) code for storing said hashed representation and syntactic attributes of said structural element in a structural representation of said VRD; and (cb) code for processing the markup language document, for each document structural element identified therein, said code comprising:

(caa) code for determining syntactic attributes of said document structural element;

(cab) code for determining a hashed representation of said document structural element; and (cac) code for storing said bashed representation and syntactic attributes of said document structural element in a structural representation of the document; and (cc) code for comparing syntactic attributes and hashed representations of said each document structural element in the structural representation of the document to corresponding syntactic attributes and hashed representations in said structural representation of said VRD to thereby establish validity of the markup language document.

According to another aspect of the invention there is provided a method of validating a markup language document against a VRD, said method comprising steps of:

determining first extended hashed representation(s) for most deeply nested syntactic element(s) of a first type in the VRD;

storing said first extended hashed representation(s) in a VRD list;

determining a second extended hashed representation for a most deeply nested syntactic element of the first type in the markup language document; and declaring said markup language document to not be invalid if said second extended hashed representation is present in the VRD list.

According to another aspect of the invention there is provided an apparatus for validating a markup language document against a VRD, said apparatus comprising:

means for determining first extended hashed representation(s) for most deeply nested syntactic element(s) of a first type in the VRD;

means for storing said first extended hashed representation(s) in a VRD list;

means for determining a second extended hashed representation for a most deeply nested syntactic element of the first type in the markup language document; and means for declaring said markup language document to not be invalid if said second extended hashed representation is present in the VRD list.

According to another aspect of the invention there is provided a computer program which is configured to make a computer execute a procedure to validate a markup language document against a VRD, said program comprising:

code for determining first extended hashed representation(s) for most deeply nested syntactic element(s) of a first type in the VRD;

code for storing said first extended hashed representation(s) in a VRD list;

code for determining a second extended hashed representation for a most deeply nested syntactic element of the first type in the markup language document; and code for declaring said markup language document to not be invalid if said second extended hashed representation is present in the VRD list.

According to another aspect of the invention there is provided a computer program product including a computer readable medium having recorded thereon a computer program which is configured to make a computer execute a procedure to validate a markup language document against a VRD, said program comprising:

code for determining first extended hashed representation(s) for most deeply nested syntactic element(s) of a first type in the VRD;

code for storing said first extended hashed representation(s) in a VRD list;

code for determining a second extended hashed representation for a most deeply nested syntactic element of the first type in the markup language document; and code for declaring said markup language document to not be invalid if said second extended hashed representation is present in the VRD list.

BRIEF DESCRIPTION OF THE DRAWINGS

A number of preferred embodiments of the present invention will now be described with reference to the drawings, in which:

FIGS. 3(a), 3(b) and 3(c) show an improved arrangement of the SAX parser of FIGS. 2(a) and 2(b);

DETAILED DESCRIPTION INCLUDING BEST MODE

Figure 1A:
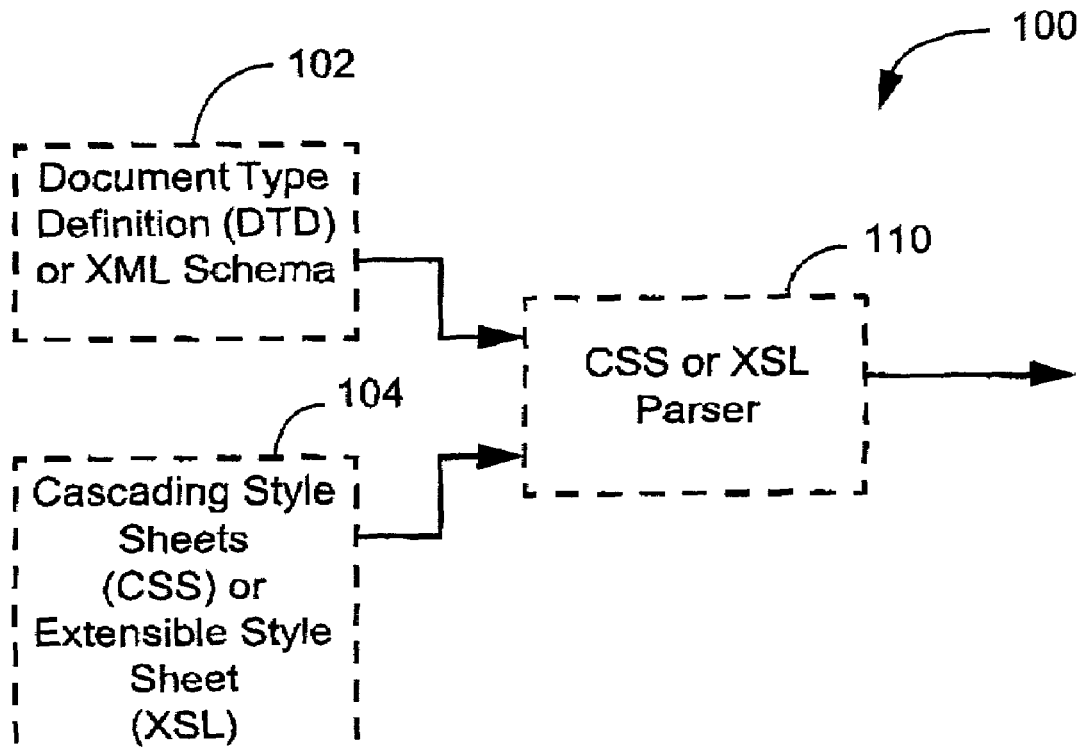
FIGS. 1(a) and 1(b) shows block representations of XML parser systems in which embodiments of the present invention can be practiced.
Figure 1B:
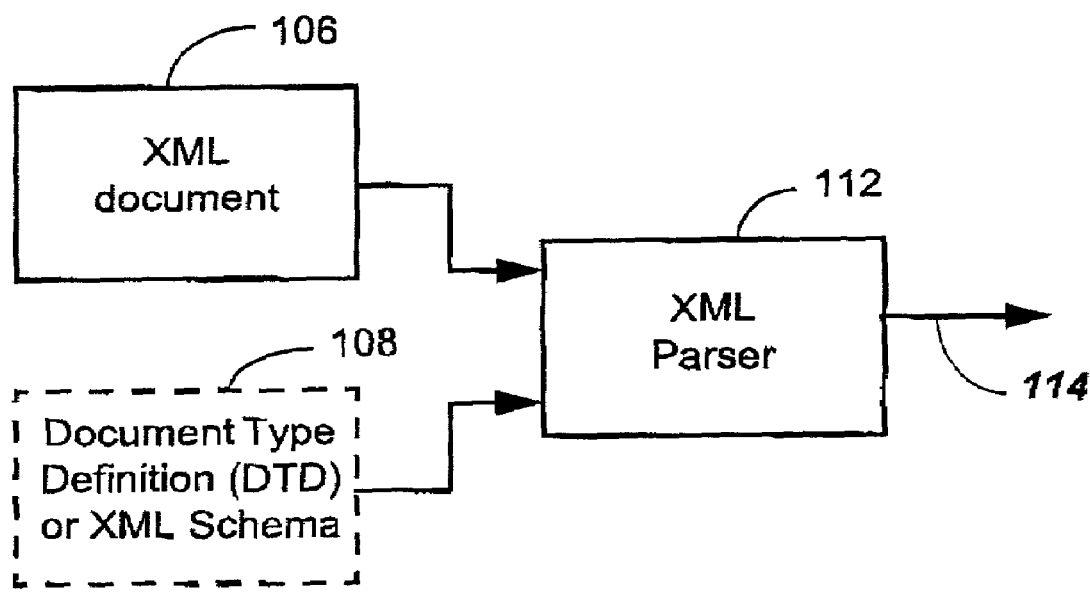

Where reference is made in any one or more of the accompanying drawings to steps and/or features, which have the same reference numerals, those steps and/or features have for the purposes of this description the same function(s) or operation(s), unless the contrary intention appears.

The inventive concept disclosed in this specification is based on the idea that memory requirements of an XML parser can be reduced, and various performance metrics can be improved, by performing a "perfect" hash of the XML tags, and possibly other elements within an XML file. A hash function is a function, mathematical or otherwise, that takes an input string, and converts it to an output code number called a hash value. A perfect hash function is one which creates a unique code number for a unique input string within a preset domain. The input string can be composed, for example, of alpha numeric characters, or other characters approved by the World Wide Web Consortium, and must be less than a certain length dictated by the hash process specifics. Alternatively, or in addition, the input string can be constrained in other ways, for example in terms of a probability of code number collision based on input context. This idea allows an arbitrary XML tag to be treated as a numeral or code, which can be stored in numeric form in memory. Since a parser normally preserves some portion of an XML structure in memory as the structure is parsed, conversion of XML tags to unique numerals allows memory requirements to be reduced, and furthermore, allows string-to-string comparisons to be replaced with equivalent, but much faster numerical comparisons.

The principles of the arrangements described herein have general applicability to parsing documents using a wide variety of mark-up languages. For ease of explanation, the disclosed arrangements are described with reference to the XML language. This is not intended, however, to limit the scope of the inventive concept. For example, the disclosed arrangements can also be applied to a UTF-16 transformation format (see International Standard ISO/IEC 10646-1 for further details of UTF-16).

Figure 2A:
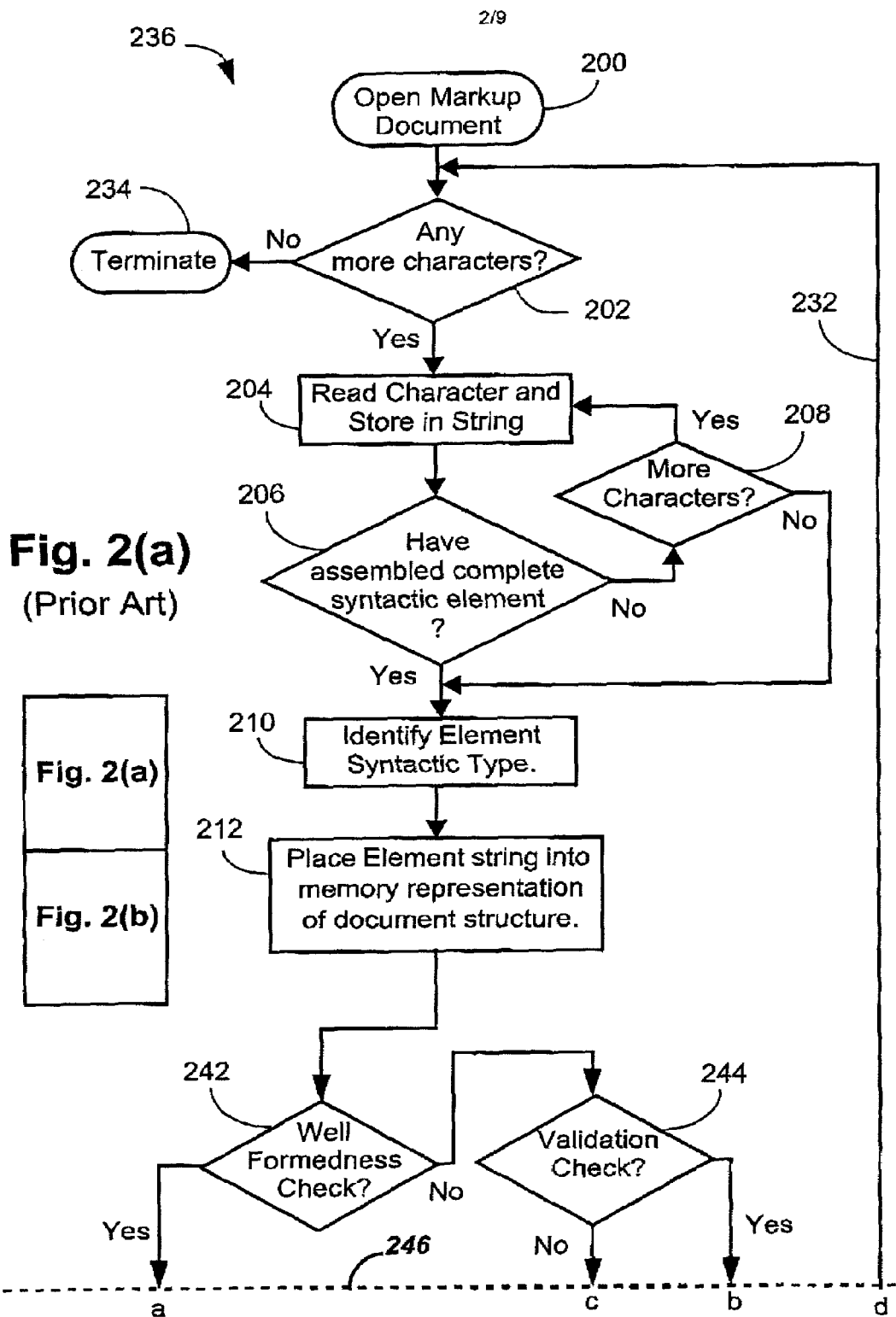
FIGS. 2(a) and 2(b) depict a flow chart of method steps for a prior art SAX parser, including optional well-formedness and/or validation checking steps.
Figure 2B:
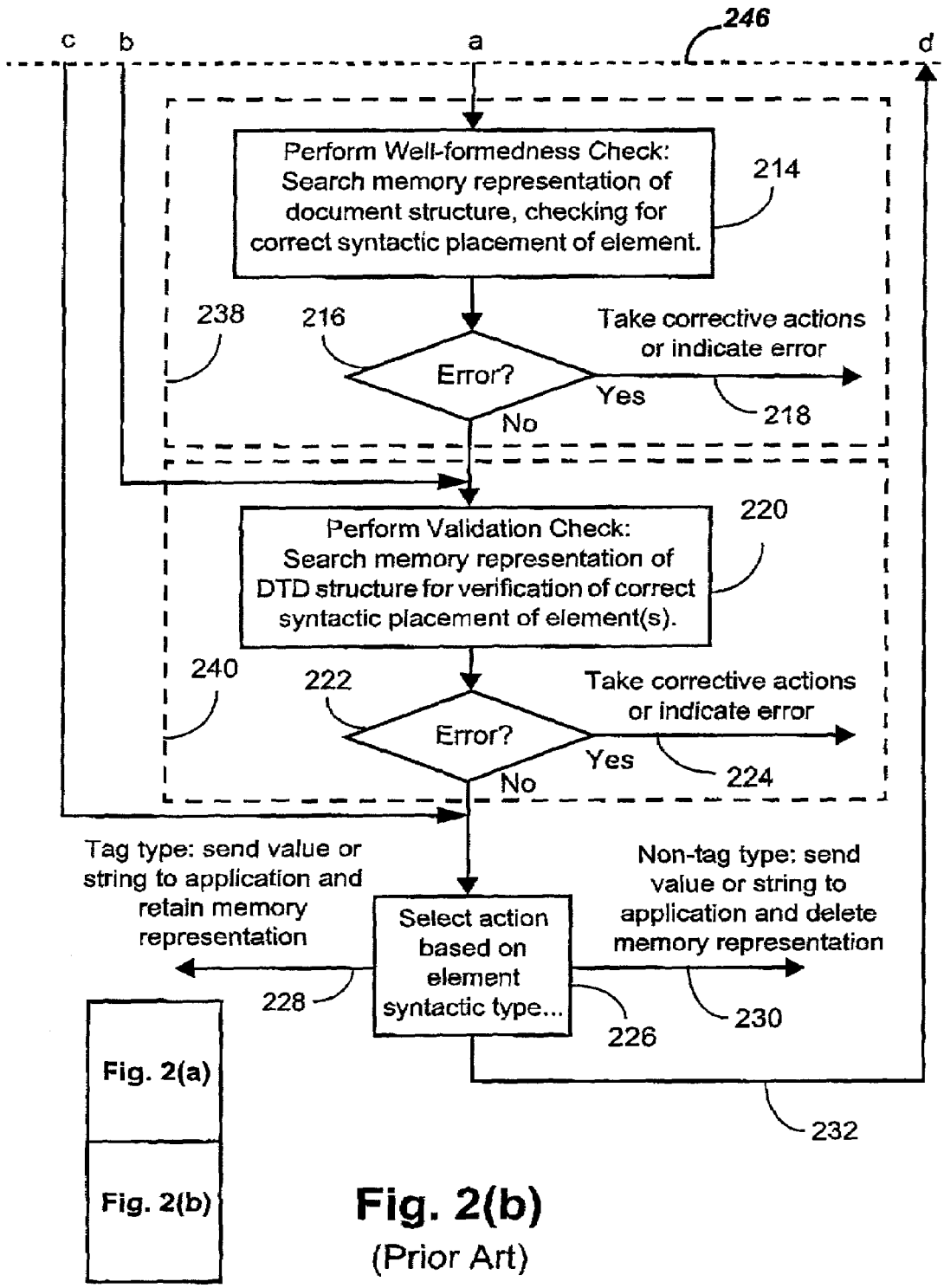

FIGS. 2(a) and 2(b) depict a prior art SAX parser process 236, which supports optional well-formedness and/or validation checking sub-processes.

In FIG. 2(a), a mark-up document, in the present case an XML document, is opened in an initial step 200. Thereafter, a decision step 202 tests whether the document contains any unprocessed (ie unparsed) characters, and if this is the case, a character is read and stored in a string in a following step 204. If further characters are, however, not detected in the testing step 202, the parsing process 236 terminates in a step 234.

Following the step 204, a check is performed in a testing step 206 to determine whether a complete syntactic element has yet been assembled, and if so, the parser process 236 proceeds to a "Syntactic Type" identification step 210. If, on the other hand, a complete syntactic element has not yet been assembled, the parser process 236 is directed to a decision block 208 which determines if any further characters are available in the document. If additional characters are available, the parser process 236 is directed according to a "yes" arrow back to the step 204. Alternatively, if no more characters are available, then the process 236 is directed in accordance with a "no" arrow to the syntactic element type identification step 210.

The "type identification" step 210 identifies a "type" for the assembled syntactic element, after which the element string is placed, in a step 212, into a memory representation of the document structure, thereby augmenting the representation as it has been assembled to this point. The memory representation of the document structure, which is typically, in the case of event driven parsers, a partial structural representation of the document, can be a simple list.

After the step 212, the process 236 is directed to a testing step 242, which determines whether a well-formedness check is to be performed. Well-formedness checks ensure that the document meets appropriate "well-formedness constraints", as defined on page 5 of "Extensible Markup Language (XML) 1.0 (Second Edition) W3C Recommendation, 6 Oct. 2000", which is available on the Internet at http:\\www.w3.org\tr\2000\rec-xml-20001006.html. Well-formedness checks test the document for compliance with general structure rules, particularly whether tags in a document have been properly nested. If such a check is to be performed, then the process 236 is directed in accordance with a "yes" arrow to "a" on a dashed boundary line 246. The dashed boundary line 246, along with reference letters "a" to "d" is mirrored by a corresponding boundary line in FIG. 2(b), in relation to which the process 236 is further described. If the well-formedness check is not to be performed, then the process 236 is directed in accordance with a "no" arrow from the testing step 242 to a testing step 244 which determines whether a "validation check" is to be performed. Validation checks involve a comparison of syntactic elements in a document against validity constraints defined in a Validation Reference Document (referred to as a VRD for the sake of brevity) such as a document type definition (DTD), as described in Section 5.1 of the aforementioned W3C Recommendation. DTDs and XML Schemas are examples of VRDs against which validation checks can be performed, however validation checks as described herein can be performed against other types of VRDs. This comparison procedure verifies correct syntactic placement of elements to a greater extent than the mere well-formedness check. If the validation check is to be performed, then the process 236 is directed in accordance with a "yes" arrow to "b" on the dashed boundary line 246. If, on the other hand, the validation check is not to be performed, then the process 236 is directed in accordance with a "no" arrow to "c" on the dashed boundary line 246.

If the well-formedness check is elected, then the process 236 is directed from "a" on the boundary line 246 to an optional sub-process 238, and in particular to a well-formedness checking step 214 found therein. The optional nature of the process 238 is denoted by the dashed rectangle outline thereof. If the validity check is elected, then the process 236 is directed from "b" on the boundary line 246 to an optional sub-process 240, and in particular to a validity checking step 220 found therein. The optional nature of the process 240 is denoted by the dashed rectangle outline thereof. If the validity check is not elected, then the process 236 is directed from "c" on the boundary line 246 to an action selection step 226.

If the well-formedness check is elected, then after the well-formedness step 214, if an error is detected in the following error checking step 216, corrective action and/or error indication takes place as indicated by an arrow 218. If, on the other hand, no errors are detected, then the parser process 236 is directed from the step 216 to the sub-process 240, in which the validation check is performed in the step 220. As noted, the parsing processing 236 can be directed to the validation checking step 220 either from the error checking step 216, or alternatively, the well-formedness checking sub-process 238 can be by-passed, and the process 236 can be directed directly to the validation checking step 220 from "b" on the boundary line 246. The optional well-formedness sub-process 238 can be bypassed if the appropriate decisions are made in the testing steps 242 and 244 (see FIG. 2(*a*)).

As noted, the validation checking step 220 involves a comparison of the identified syntactic element in the markup document being considered against a document type definition (DTD). This comparison procedure verifies correct syntactic placement of elements to a greater extent than the mere well-formedness check described in relation to the sub-process 238.

Following the validation step 220, if an error is detected in an error checking step 222, corrective action is taken, and/or an error indication is produced, as depicted by an arrow 224. Alternatively, if no error is detected, the parser process 236 proceeds to the action selection step 226, where an action is selected based upon the type of the syntactic element being considered. The optional sub-processes 238 and 240 can both be bypassed, if the appropriate decisions are made at the decision steps 242 and 244 in FIG. 2(*a*). If both of the aforementioned sub-processes are bypassed, then as noted the parsing process 236 is directed from "c" on the boundary line 246 directly to the action selection step 226.

If the syntactic element is a tag, then as depicted by an arrow 228 the tag value, or a representative string, is sent to the application in respect of which the parsing process is being performed, and a memory representation of the tag is maintained. If, on the other hand, the element type is a non-tag type, then as depicted by an arrow 230, the element value string is sent to the associated application, and the memory representation of the element is deleted. Finally, the parsing process 236 is directed, as depicted by an arrow 232, to "d" on the dashed boundary line in FIG. 2(*b*), and from "d" on the corresponding dashed boundary line 246 in FIG. 2(*a*) to the character testing step 202.

Significant memory requirements arise from the verbose nature of the XML document, resulting in correspondingly significant memory requirements to store the document structure in its original string form. This document structure is referred to in the step 212. Furthermore, an associated significant processing load, relating to performance of string comparisons between variable length alpha-numeric strings, arises both in the well-formedness checking step 214, and in the validation checking step 220.

A partial memory representation of the document must typically be stored, and string checking must typically be performed, both (i) in relation to the step 214 in regard to checking for closure of hierarchy branches, namely matching end tags to start tags, and also for checking for non-overlapping branches, and (ii) in relation to the step 220, in which similar processes are required as in (i), as well as checking conformity of structure and tag names against the DTD.

A parser must normally preserve some portion of an XML structure in memory as the XML structure is parsed. Even for a SAX parser, a local portion of the XML structure must be retained in memory for correct operation. If however each XML tag is converted to a unique numeral using a hash function, memory requirements are typically reduced, since the numeral resulting from the hash operation is smaller than the associated arbitrary-length XML tag string. Furthermore, string-to-string comparisons, required for matching beginning & end tags, can be replaced with much faster numerical comparisons, thereby reducing the processing load.

Typical hash algorithms include (i) Cyclic Redundancy Coding (CRC) algorithms (commonly used for signature analysis or error-detection/correction in data transfer & storage), (ii) fully lossless encoding algorithms, and (iii) Huffman encoding algorithms.

Typically, a suitable hash algorithm must be static in its operation, or in other words it must always return the same hash result for the identical input conditions over the required set of data. The required set of data can, however, vary according to the circumstance. The data set can thus typically comprise at least an entire markup document, but can also include a relevant DTD or XML Schema, linked markup documents, and related or linked markup documents in different languages, eg a CSS document referenced by an XML document. A static hash algorithm can, however, be used where necessary by resetting the algorithm whenever tag syntax is encountered, for example whenever the non-literal '<' character is found in an XML document. The hash algorithm can also be reset where an <!ELEMENT string is found in an XML DTD document, or wherever a valid tag selector is permitted in a CSS document.

A reference in an input markup document can be used to signal, or to select a suitable hash algorithm. This can be done in much the same way as markup documents can reference other markup documents, DTDs, stylesheets, character encodings, namespaces, and so on. For example a particular hash algorithm can be identified with a particular namespace, thereby permitting indirect reference to a hash algorithm via a namespace reference within a document. A hash algorithm implementation can be wholly, or partially included within a markup document, along with associated parameterisation. Such methods of referencing or including hash algorithms can be useful for optimisation purposes, where different hash methods have been optimised for use with particular markup documents, thereby improving performance and memory usage in destination devices or systems. Alternatively, the aforementioned referencing methods can be useful for matching purposes. This refers to applications involving one or more markup documents, where error checking or completion of parsing or other functions are required, and where one or more other documents (e.g. a DTD) have already been hashed by the same algorithm.

Further refinements are possible in the above approach, for example involving optional hashing of DTDs. This reduces Read Only Memory (ROM) requirements for storing DTDs, and provides for faster validation processing of XML documents, by allowing comparison of numerical values rather than (slower) string comparisons.

FIGS. 3(*a*), 3(*b*) and 3(*c*) illustrate one arrangement of an improved SAX parser process 344. In FIG. 3(*a*), steps 300, to 310 are identical to corresponding steps 200 to 210 which have been described in relation to FIG. 2(*a*). After the step 310, the assembled syntactic element is tested to ascertain its nature as a tag, or another element type, in a testing step 312. If the element is a tag, the parsing process 344 is directed to a hash step 318 by an arrow 316. The hash step 318 determines, using respective processors 414 or 505 in FIGS. 5 and 6, a unique numeric representation of the syntactic element. This results in a more memory efficient representation of the element, which also lends itself to simpler and faster comparison operations in the numeric, rather than the alpha-numeric domain. Both the element string depicting the syntactic element, and the hash value thereof, are retained at this point of the process 344, however it is the hash value, and not the string value, which is inserted, in the step 318, into the memory representation of the document structure using respective memories 418 and 506 (see FIGS. 5 and 6).

Figure 3A:
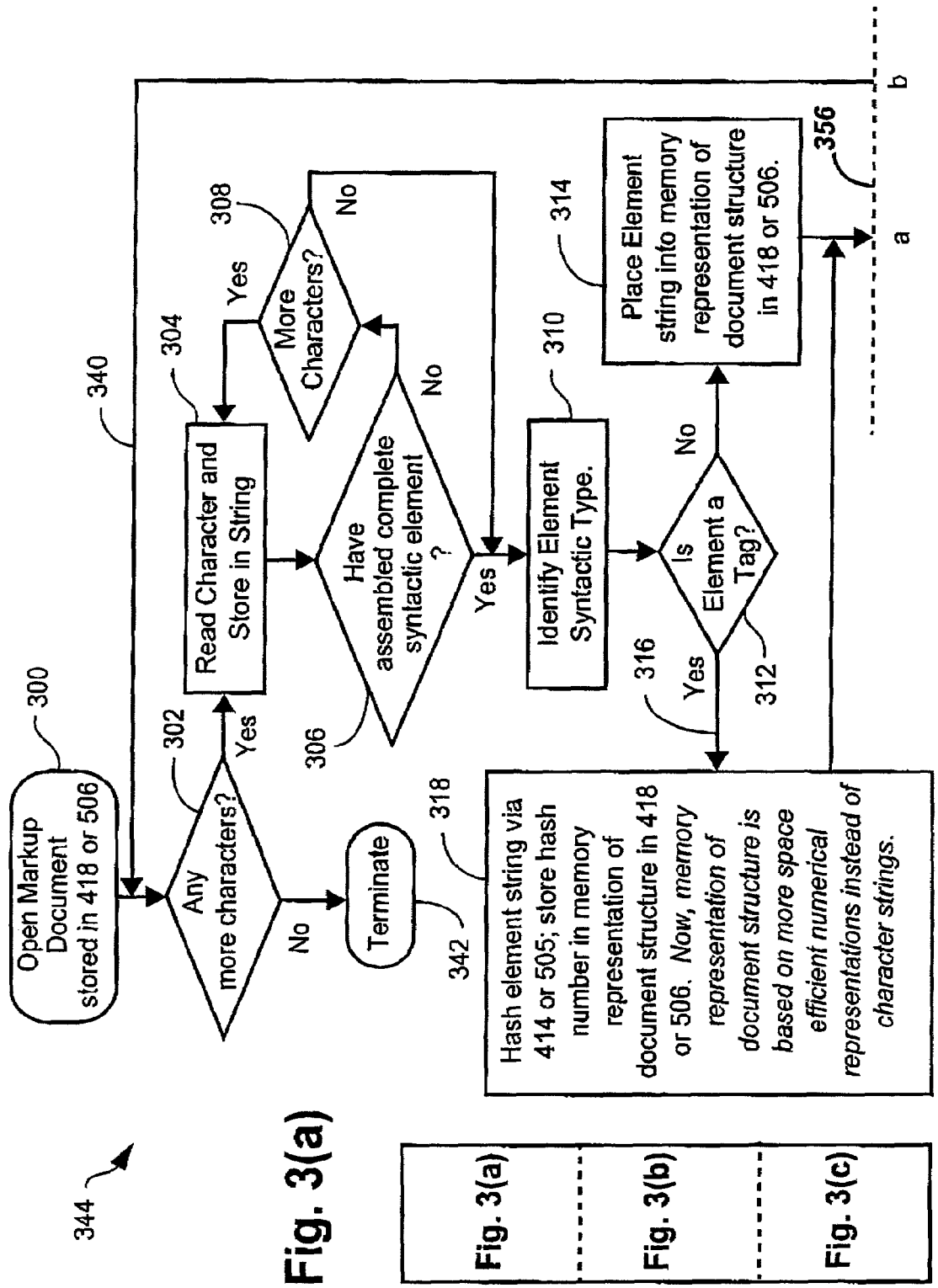
Figure 3B:
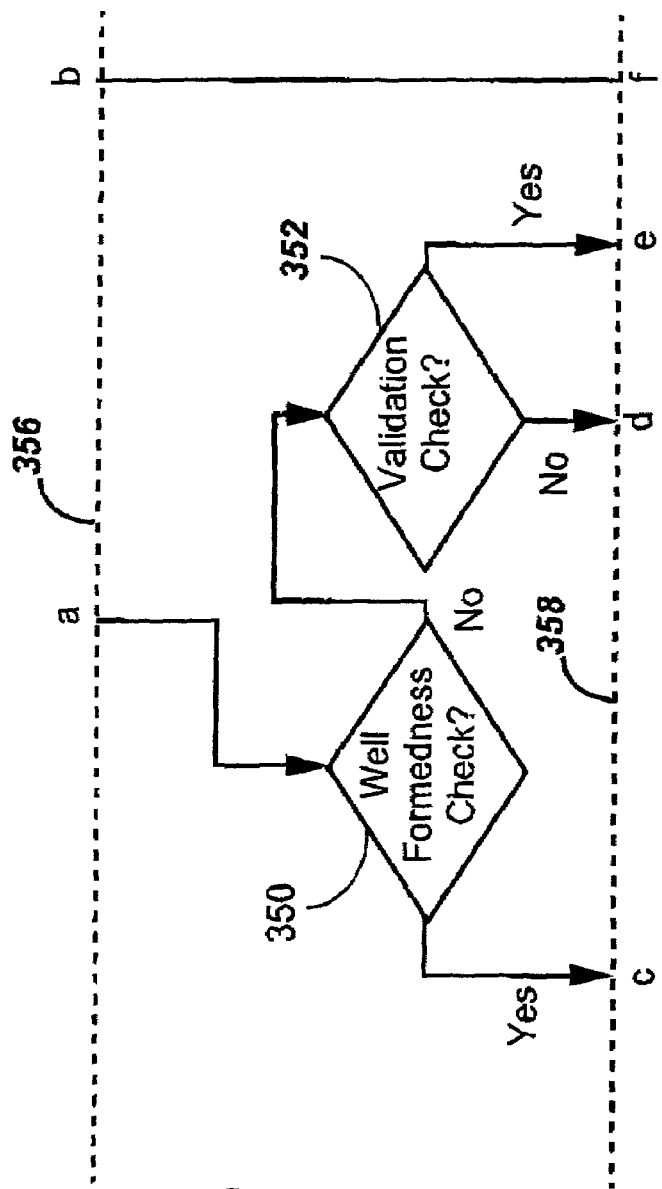

In order to better appreciate operation of the parsing process 344 as described in relation to FIGS. 3(a), 3(b) and 3(c), parsing of the exemplary XML fragment [1] is considered firstly in relation to the parsing process 236 described in relation to FIG. 2. In this case, the XML fragment [1] yields the following hierarchical representation of parsed mark-up tags in the sub-process 212:

| | | | |
|---|---|---|---|
| 206 | Shakespeare | | |
| 215 | div | | |
| 220 | mult | | |
| 221 | /mult | | |
| 225 | banquo | | |
| 235 | | quote | |
| 240 | | quote | [2] |
| 245 | /banquo | | |
| 250 | Hamlet | | |
| 251 | | quote | |
| 252 | | /quote | |
| 253 | /Hamlet | | |
| 255 | /Shakespeare | | |

In contrast, the differentiated treatment of tag elements and non-tag elements in the parsing process 344, as described in relation to FIG. 3(a), results in an equivalent hierarchical representation being generated by the step 318. The equivalent hierarchical representation is depicted in [3]. The hierarchical representation in [3] is made up of parsed hashed mark-up tags. For the sake of this example, a domain of tag names is constrained to those shown in the following Table 1, and a hash mapping (which is functionally equivalent to application of a hash "function") is shown in the following table:

TABLE 1

Hash Mapping

| Tag | Hash Code Number |
|---|---|
| Shakespeare | 133 |
| Div | 326 |
| Mult | 371 |
| Banquo | 787 |
| Quote | 629 |
| Hamlet | 411 |

Based on the above hash mapping, the following hierarchical representation of the XML fragment shown in [1] results:

| | | | |
|---|---|---|---|
| 205 | 133 | | |
| 215 | | 326 | |
| 222 | | 371 | |
| 223 | | /371 | |
| 225 | | 787 | |
| 235 | | | 629 |
| 240 | | | /629 | [3] |
| 245 | | /787 | |
| 254 | | 411 | |
| 255 | | | 629 |
| 256 | | | /629 |
| 257 | | /411 | |
| 255 | /133 | | |

Returning to FIG. 3(a), the parsing process 344 is directed from the step 314 to "a" on a dashed boundary line 356. The dashed boundary line 356, along with reference letters "a" and "b" is mirrored by a corresponding boundary line in FIG. 3(b), in relation to which the process 344 is further described.

Turning to FIG. 3(b), the process 344 continues from "a" on the dashed boundary line 356 to a testing step 350 which determines whether a well-formedness check is to be performed. If such a check is to be performed, then the process 344 is directed in accordance with a "yes" arrow to "c" on the boundary line 358. The dashed boundary line 358, along with reference letters "c" to "f" is mirrored by a corresponding boundary line in FIG. 3(c), in relation to which the process 344 is further described. If the well-formedness check is not to be performed, then the process 344 is directed in accordance with a "no" arrow to a testing step 352 which determines whether a validation check is to be performed. If the validation check is to be performed, then the process 344 is directed in accordance with a "yes" arrow to "e" on the dashed boundary line 358. If, on the other hand, the validation check is not to be performed, then the process 344 is directed to "d" on the dashed boundary line 358.

Turning to FIG. 3(c) if the well-formedness check is to be performed, then the process 344 is directed from "c" on the dashed boundary line 358 to a well-formedness checking step 320. If, on the other hand, the well-formedness check is not elected, then the process 344 is directed from "e" on the dashed boundary line 358 to a validation checking step 326. If neither a well-formedness check or validation check is elected, then the process 344 is directed from "d" on the dashed boundary line 358 to an action selection step 334.

The well-formedness checking step 320 performs well-formedness checking using respective processors 414 or 505 and forms part of an optional process 346. The optional nature of the process 346 is depicted by use of dashed lines. Similarly, the validation step 326 forms part of an optional sub-process 348, the optional nature thereof being depicted by use of dashed lines.

It is apparent that the hierarchical representation depicted in [3] allows string comparisons to be replaced by faster and more efficient numerical comparisons, thereby reducing the associated computational burden. Furthermore, the hierarchical representation shown in [3] is a more memory-efficient representation, than that shown in [1] and accordingly the representation shown in [3] is more suited to memory-constrained applications as previously discussed.

Returning to FIG. 3(c), if well-formedness checking is elected, then after well-formedness checking is performed in the step 320, the parsing process 344 is directed to an error checking step 322, whereupon if an error is detected, as depicted by an arrow 324, corrective action is taken, and/or an error is indicated. The well-formedness check typically considers whether tags in a document have been properly nested. Thus, for example, having reference to [2] the tag pair "Hamlet" and "/Hamlet" are properly nested within the tag pair "Shakespeare" and "/Shakespeare" since the "Hamlet" tag pair is fully nested within the "Shakespeare" tag pair, and the tag pairs do not, for example, overlap each other.

If, on the other hand, no error is detected, the parsing process 344 is directed to the optional process 348, in which the validation checking step 326, using respective processors 414 or 505, is performed with reference to a DTD or an XML Schema. As noted, validation checking is a more detailed form of checking than well-formedness checking. Thus, for example, whereas the well-formedness check considers whether the "Hamlet" tag pair is properly nested within the "Shakespeare" tag pair, validity checking, in contrast, both checks for proper nesting in the sense that the "Hamlet" tag pair is fully nested within the "Shakespeare" tag pair, but also checks whether "Hamlet" tag pairs may legally be nested in this way. There may, for example, be a situation where, in fact, "Shakespeare" tag pairs must be nested within "Hamlet" tag pairs, rather than the other way around. Thus, the validity checking process checks hierarchical relationships of tags, in this case being whether "Hamlet" tag pairs may be nested within "Shakespeare" tag pairs, as well as considering whether nesting has been properly, namely completely, performed.

In order to perform the validation step 326, DTD or XML Schema tags are first hashed in a hashing step 328, in order to bring the DTD/XML Schema memory representation into conformity with the hashed nature of the mark-up document which has been generated by the hash step 318. The validation checking step 326 compares the mark-up document structural representation generated in the step 318 to the structural representation of the DTD/XML Schema generated in the step 328, to verify correct syntactic placement of syntactic elements in the markup document, noting that the string comparisons required for this comparison as used in step 220 in relation to FIG. 2, are now replaced, in FIG. 3(c), by faster and more efficient numerical comparisons, as a result of the hashing operations in steps 328 and 318.

After validation, the process 344 is directed to an error checking step 330, in which corrective action and/or error indication is performed as indicated by an arrow 332. If no errors are detected, the parsing process 344 proceeds to an action selection step 334, whereupon if the syntactic element is a tag type, the corresponding tag string is sent to the application in respect of which the parsing process is being performed, and the tag string itself is deleted from memory, this being either 418 or 512 in FIGS. 5 and 6 respectively. The associated hashed tag memory representation is, however, retained. Accordingly, no string-based memory representation of the tag is retained, other than one copy of the currently parsed tag string. The memory representation of the tag is thus only in hashed form. If the element syntactic type is either a non-tag type, or a non-tag name type, then as depicted by an arrow 338, the value of the element, or a string representation thereof is sent to the associated application, and the associated memory representation is deleted. The parsing process 344 now loops back, as indicated by an arrow 340, to "f" on the dashed boundary line 358, and thereafter to the corresponding "f" on the dashed boundary line 358 in FIG. 3(b), and thereafter to "b" on the dashed boundary line 356, and thereafter to "b" on the dashed boundary line 356 in FIG. 3(a), and finally to the character testing step 302. If no further characters are detected, the parsing process 344 terminates in a step 342.

The XML document fragment [1], with tags in hashed form, has the following form:

```
505    <133>
110    <!-This is a comment-->
515    <326 class="preface" Name1="value1" name2="value2">
520    <371 list=<></371>
525    <787>
130    Say                                              [4]
535    <629>
540    goodnight </629>,
545    Hamlet.</787>
550    <411><629>Goodnight, Hamlet. </629></411>
555    </133>
```

The representation of closing tags (which typically use syntax: </section> as opposed to start tags which use syntax <section>) can be defined in various ways, thereby attaining more, or less, compatibility with the XML standard. It is noted that start tags and end tags are considered, in the present description, to be "equivalent types". Furthermore, the fact that the start and end tag perform a collective function, namely delimiting sections of document content, is taken to mean that there is a relationship between the two tags. It is further noted that the aforementioned syntax for start and end tags means that the end tag is a modification of the start tag, wherein a distinguishing character, namely a "/" is incorporated into the start tag in order to produce a corresponding end tag. Compatibility with the XML standard can be more important in some instances than in others. In the preferred embodiment, the '/' character of a current tag string is typically removed prior to hashing the following tag name, in order that identical start and end tag names return the same numeral from the hashing function. An XML tag is exemplified by </Name Attribute>, as can be seen in Section 3.1 of "Extensible Markup Language (XML) 1.0 (Second Edition) W3C Recommendation, 6 Oct. 2000", which is available on the Internet at http:\\www.w3.org\ tr\2000\rec-xml-20001006.html). In the present description, the term "tag" can refer, depending on the context, to either a part of, or the entirety of, the particular tag being considered. Alternatively, there may be situations where it is desired to retain an equivalent representation of the '/' character (identifying the end tag) in memory. This can be done in a variety of ways, such as: (i) reinserting the '/' character or an equivalent character into memory in proximity to the end tag hash numeral so as to indicate that it is an end tag, (ii) using a boolean value to indicate the end or start state of a hashed tag, or (iii) negating the end tag hashed value so that a simple addition of start and end tags yields zero for a perfect match. In Option (iii), the hashed start tag has been modified by an operator, in the present case a simple negation operation, in order to produce the requisite hashed end tag. Option (iii) requires that a sign bit be guaranteed to be free from influence by the hashing algorithm. This option is, in fact, very similar to the boolean flag option (ii).

Furthermore, structured hash numbers can be generated in which a hash number for a nested tag can explicitly indicate the higher-level XML tags within which the first tag is nested. Thus, for example, where tag 123 is nested inside tag 987, then instead of being designated as nested tag 123, it can be designated as 987.123. This structured, or "extended", hashing can allow further parsing performance improvements by reducing structure-spanning operations, ie by reducing an amount of the XML document which must be held in memory while the end-points of a tag pair are being searched for.

It is also noted that extended representations need not be based upon hashing, but can also be based upon strings, or "enumeration", which is a process whereby a mapping is defined between tag names and numerals, thereby creating an enumeration table or index. A simple form of enumeration is to merely list all the tag names, and to number the listed tags. Thus, for example, a concatenated string of the form "Shakespeare.banquo.quote" represents a string-based extended representation of three concatenated tags.

A structured equivalent hashed markup example for the XML fragment [3] is presented in [5] below using negated, hashed end tags.

```
   133
   133.326
   133.371
   133.-371
   133.787
   133.787.629          -> 013307870629
   133.787.-629         -> -013307870629
   133.-787                                    [5]
   133.411
   133.411.629
   133.411.-629
   133.-411
   -133
```

In [5], the structure of nested tags is converted from the form shown in [3] into a series of concatenated hashed tags, in which each subsequent lower (ie. more deeply nested) hierarchical level of hashed tag is directly linked to its previous upper hierarchical levels. This allows simple numerical comparison to be performed with a similarly parsed structure from a hashed DTD. In fact, each line in [5] is represented, as shown in [5] for lines 4 and 5, by a single numeral which is combined by concatenation of the set of hashed tags encountered. This single numeral represents in a very compressed form both the identities and relationships of the original input tags, and accordingly enables a very efficient comparison method with a similarly hashed DTD. It can be seen that the numerical tag sets can be used to represent the document structure in a highly compressed form. A validation check can be performed using merely the hashed start tag sets, noting that each such set represents the deepest, and entire, structure of each branch of the document structure. For instance, the structure of [5] can be minimally represented in [6] as follows:

```
         01330326
         01330371                              [6]
         013307870629
         013304110629
```

A DTD or XML schema structure can also be represented by the same method.

A single, or multiple set of numerical comparisons between a tag set from the parsed & hashed input document and a tag set from the parsed & hashed DTD replaces a series of string and structure comparisons normally required in XML parser validation. It can be recognized that any alternate valid structures defined by a DTD or XML schema can be encoded into unique hashed tag set numerals for later comparison with hashed tag set numerals generated from an input XML document.

Figure 4:
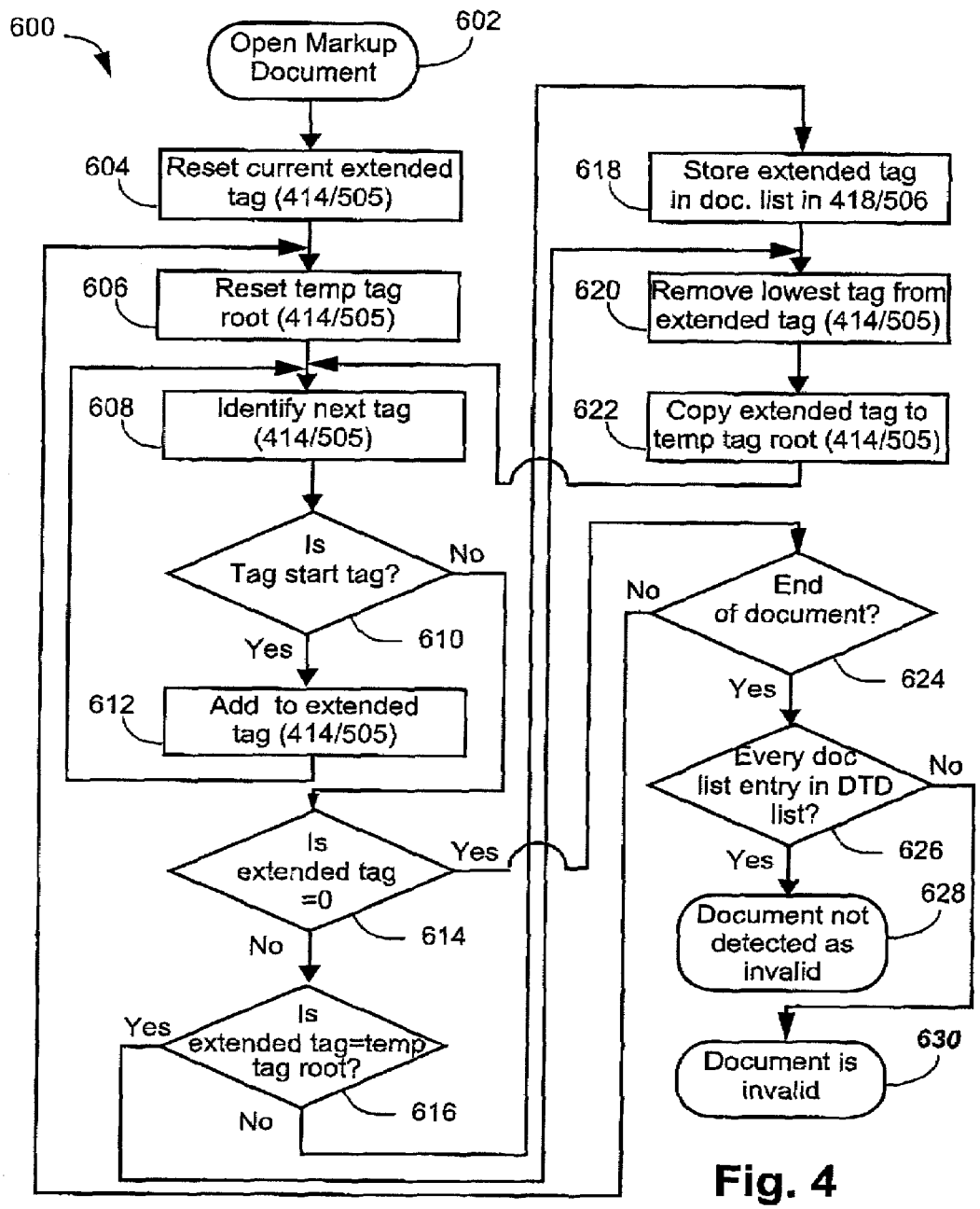
FIG. 4 depicts a process for validating a document against a reference document such as a DTD, or an XML schema.

FIG. 4 depicts a process 600 for validating a mark-up document against a VRD such as, for example, a DTD, or an XML schema. The process 600 commences with a step 602 in which a markup document to be validated is opened. Therafter, in a step 604, a current extended tag is reset by a respective processor 414 or 505 in FIG. 5 or FIG. 6. In the description relating to FIG. 4, the terms "tag", "extended tag", "temporary tag" and so on refer to the hashed representations of the respective tags. In a following step 606, a temporary tag root is reset by one of the respective processors 414 or 505, after which a next tag in the markup document is identified in a step 608. Thereafter, a testing step 610 determines whether the tag identified in the step 608 is a start tag, in which event the process 600 is directed in accordance with a "yes" arrow to a step 612 which adds the tag identified in the step 608 to the extended tag using one of the respective processors 414 or 505. The process 600 is then directed from the step 612 back to the step 608.

If the testing step 610 determines that the next tag is not a start tag, then the process 600 is directed in accordance with a "no" arrow to a testing step 614, which determined whether the extended tag="0", which represents the root level of the document. If the "0" value is detected, then the process 600 is directed in accordance with a "yes" arrow to a testing step 624 which determines whether the end of the document has been reached. If this is not the case, then the process is directed in accordance with a "no" arrow back to the step 606. It is noted that detection of a "0" value in the step 614 may also result from an document structure which is not well formed, such as would be the case for a structure having a mismatched number of start and end tags.

If the testing step 614 determines that the extended tag value is not equal to "0", then the process is directed in accordance with a "no" arrow to a testing step 616, which determines whether the extended tag is equal to the temp tag root value. If this is found not to be the case, then the process 600 is directed in accordance with a "no" arrow to a step 618 which stores the extended tag in a document list in a respective memory 418 or 506. If on the other hand, the testing step 616 determines that the extended tag is equal to the temp tag root, then the process 600 is directed in accordance with a "yes" arrow to a step 620 which removes the lowest (namely the most deeply nested) tag from the extended tag, using a respective processor 414 or 505. Thereafter, in a step 622, the process 600 copies the extended tag to the temp tag root, after which the process is directed back to the step 608.

Prior to returning to the testing step 624, it is noted that the process 600 as heretofore described is directed to the markup document whose validity is being checked. There is also, however, an identical process, not explicitly described, which is applied to the validation reference document (VRD) to thereby produce a VRD list against which the document list produced by the process 600 can be tested. The process 600 and the equivalent process directed to the VRD typically occur at different times. The process 600 occurs for every document being validated, and produces a list of extended hash representations for each particular document being validated. The VRD list can be produced substantially concurrently with the process 600, providing that the VRD list is completed prior to the step 626. Alternately, the VRD process can be performed off line, and the resultant list provided to the process 600 prior to the step 626.

Returning to the step 626, and since the VRD list is available as noted, the step 626 determines whether every entry in the document list is to be found in the VRD list. If this is the case, then the process 600 is directed in accordance with a "yes" arrow to a step 628 which declares that the document is not detected as invalid. If on the other hand, the document list has an entry which is not to be found in the VRD list, then the process 600 is directed in accordance with a "no" arrow to a step 630 which declares that the document is invalid.

The above description compares, as described in more detail in regard to the step 626, all the document list entries with all the VRD list entries. An alternate process is to test each extended tag, after the step 616, against the complete VRD list in a step similar to the step 626, in which event if the document extended tag is not to be found in the VRD list, the process 600 can proceed directly to the step 630, saving unnecessary further testing. In the event that the extended tag is however to be found, then the process 600 can be directed to the step 620 and so on. The alternate arrangement provides earlier recognition of an error, and immediately aborts the validation process, which provides added efficiency provided the VRD list is relatively short. If a complete validation check is implemented with the above method, then the step 628 indicates that the document being considered is valid, In order to further illustrate the validation method described, the following structure fragment is considered, in which start tags are "01" to "05", and the corresponding end tags are "–01" to "–05" respectively.

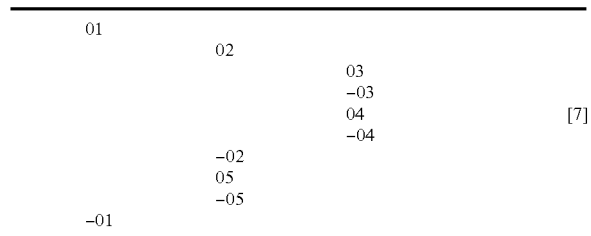

In functional terms, the process 600 traverses down to the deepest part of a branch in the hierarchical structure of the mark-up document, namely from "01" on the first line of [7] to "03" on the third line of [7], and stores an extended hash representation for the deepest part of that particular branch, namely "010203". The process then traverses up the branch, discarding end tags, until it finds another start tag which indicates a new branch to pursue, which is "04" on line 5 of [7] in this example. As the process traverses down the new branch, the process preserves the extended hash representations of higher levels of the hierarchy, until it has stepped back above those levels. An error in the document structure, resulting in an invalid document or a document which is not well formed, will typically return extended hash representations that do not match those of the VRD. The step 620 may optionally include well-formedness checks of the retrieved end tag against the previous start tag, thereby providing a well-formedness match if the document is well formed. It is noted that the previous start tag is the lowest tag in the extended bash representation. For example the DTD/XML Schema may return end tags at the testing step 610 that do not match the lowest start tag in the extended hashed representation in the step 620, thereby failing a well-formedness check.

The test at the step 626 typically seeks to match the extended hashed representations of the mark-up document structure against those hashed representations listed for the DTD of that document. The hashed representations of the document structure will typically be a subset of the deepest structural representations from the DTD list. Accordingly, a valid XML document is permitted to contain any legal subset of the structural nesting defined in the corresponding VRD, or DTD. Therefore, a typical test in the step 626 includes comparisons of shallower hashed structural representations of the document against a deeper hashed representation of the DTD. Thus, for example, an extended hashed representation "0123" from the XML document would be assessed as "valid" when compared to a hashed representation "01230456" from the corresponding DTD.

The validation process 600 shown in FIG. 4 can be optimized to check the more complex parts of a document structure, such as the most deeply nested portions, in a fast but incomplete check of validity. Thus, an optimal combination of speed and validity sensitivity can be selected, in order to implement a particular validating parser having arbitrary performance characteristics.

The validation method 600 can also be modified to perform at least portions of "standard" well-formedness checks. Thus, for example, in the step 620, the hashed representation of the end tag can be checked against the lowest hierarchical hashed tag representation within the extended tag representation. If the aforementioned representations do not properly resolve to the same original tag identity, then the document is not well-formed, and a recovery, or error action can be performed.

The above method can be extended to include hashed representations of defined attributes within a structure, either separately, or together with structure checking.

It is apparent that this method of validation and well-formedness checking can be applied to an input document in a separate process to the process for parsing of the document structure and content. Thus, for example, the method 600 can be optimised in order to achieve an efficient and high-speed validity and well-formedness check that can be performed even in environments where central processing unit (CPU) cycles and memory size are not particularly subject to major constraints. The advantage of performing a separate check in such systems includes the fact that a highly optimized check can be used to quickly discard "invalid" documents. This can save considerable time and processing of at least part of an invalid document, thereby preventing, for example, (i) parsing of the document into a full DOM tree representation and then performing validation checking only to find that the document is invalid, or (ii) commencing further processing of a first (valid) part of a document prior to detecting an invalid second part of the document, the further processing of the first part of the document being thereby rendered futile. Another advantage is that after a document is discovered to be invalid using the fast validation check, processing of a following job can be immediately commenced.

An "imperfect" hash process ie a hash process which is not guaranteed to produce a unique numeral for each alphanumeric input string, can be adequate in certain cases, in particular where the maximum length of XML tag strings is constrained, or is at least constrained to some level of probability. Furthermore, in cases where the set of XML tag strings is constrained to some limited number of character permutations, or is constrained with some probability to a limited number of character permutations, the imperfect hash process can be designed, or selected, to operate adequately.

A communications standard, or alternative public or private format(s) for numerical representation of a document structure can be defined or described based on the use of a hash algorithm. This technique allows a form of compression, which can be of benefit in transmission of XML data which normally involves transmission of a significant amount of data because of its verbosity, and human-readable ASCII form. Various options exist for retaining or discarding human-readability, for example by combining (perfect) hashing with other forms of compression, which are respectively applied to differing element types within an XML file. For instance, it is possible to replace XML string tags with unique, human-readable numerals derived from a perfect hashing algorithm. Un-hashed syntactic and other elements can also be compressed by a lossless compression technique for transmission between processes or devices, thereby reducing the amount of transmitted data.

An inverse or reversible hash algorithm can be referenced or included where required as discussed in the previous paragraph. This is used where, for example, such an algorithm is needed to decode or decrypt one or more markup tags into a human-readable string for display or labelling purposes from a pre-hashed, transmitted markup document, where it is otherwise not necessary to do so for parsing and error-checking purposes. Another use of a reverse or inverse hash algorithm is to allow decryption of markup tags or other data to enable a restricted function or feature relating to the transmitted markup document. Reverse or inverse algorithms can also be used for matching a transmitter and a receiver of markup documents, where the reverse or inverse hash algorithm is already included in the receiver, and is not transmitted, but might be referenced in the markup document. Examples of reversible or invertible hash algorithms include (i) fully lossless encoding algorithms and (ii) Huffman encoding algorithms.

The aforementioned arrangements can be applied to any markup language, with particular advantages where one or more of the following conditions apply, namely (i) the markup language allows definition of tag names (e.g. XML, DTD, CSS, XSL, etc), (ii) tag names use large character encoding tables (e.g. UTF-16) and/or tag name length is not typically shorter than the hashed representation thereof, (iii) the intended application using or receiving a markup document typically requires representation of complex structures with more than one hierarchical level of nesting within a markup document, XML Schema, or DTD, (iv) some form of checking, typically well-formedness or validation, is required for the input markup document, (v) the markup parser and/or application have strong limitations on memory capacity (for example, embedded or low-cost CPU systems) or memory management (for example in systems having no virtual memory, or no dynamic memory allocation), and (vi) the markup parser and/or application need to operate quickly on potentially complex, highly-nested, markup documents.

The disclosed method of parsing a markup language document can be implemented in dedicated hardware such as one or more integrated circuits performing the functions or sub functions of parsing a markup language document. Such dedicated hardware may include graphic processors, digital signal processors, or one or more microprocessors and associated memories.

Figure 5:
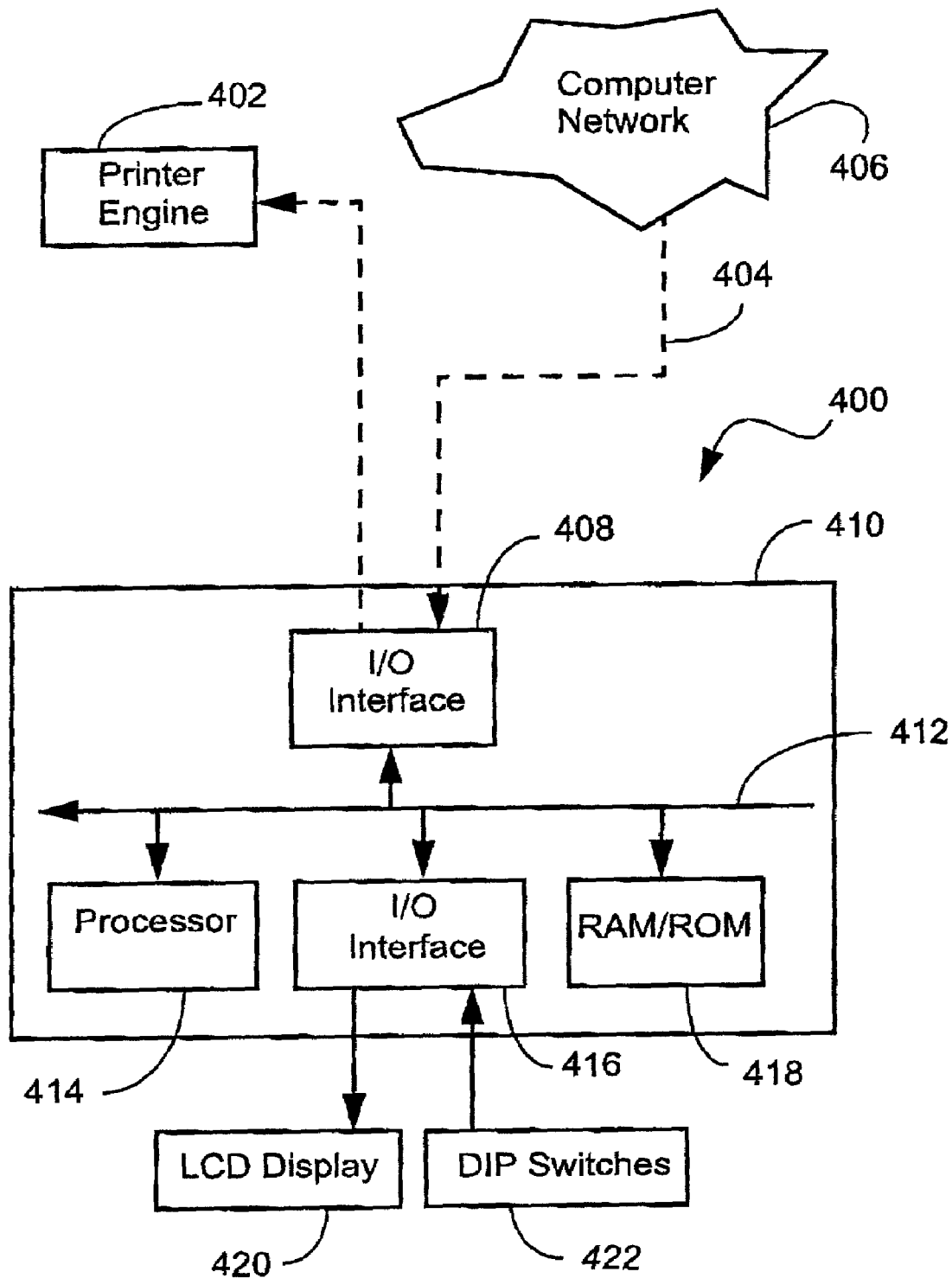
FIG. 5 is a schematic block diagram of a special purpose embedded computer upon which an arrangement of the improved SAX parser can be practiced.

The method of parsing a markup language document can alternatively be practiced using a special purpose embedded computer system 400, such as that shown in FIG. 5 wherein the processes of FIGS. 3(*a*), 3(*b*), 3(*c*), and 4 may be implemented as software, such as an application program executing within the embedded computer system 400. The computer system 400 is typically integrated (embedded) into an end system such as a printer (not shown) and drives a printer engine 402 in the printer. In particular, the steps of the method of parsing a markup language are effected by instructions in the software that are carried out by the embedded computer. The software may be stored in a computer readable medium, including Read Only Memory (ROM) 418 or Random Access Memory (RAM) 418 or other types of memory (not shown). The software is loaded into the embedded computer during manufacture, or by software upgrades performed on-site.

The embedded computer system 400 comprises a computer module 410, input devices such as a switch module 422 for parameter setting, an output device such as a Liquid Crystal Display (LCD) showing job status, and the printer engine 402. The embedded computer 400 is typically physically integrated into the printer (not shown). Print jobs which originate at other computers (not shown) attached to a computer network 406 are sent to the embedded computer 400 by a connection 404 to an Input/Output (I/O) interface 408.

The embedded computer module 410 typically includes a processor unit 414, a memory unit 418, for example formed from semiconductor random access memory (RAM) and read only memory (ROM), input/output (I/O) interfaces including a switch module and LCD interface 416, and an I/O interface 408 for the printer engine 402 and network 406. The components 408, and 414 to 418 of the embedded computer 410 typically communicate via an interconnected bus 412 and in a manner which results in a conventional mode of operation of the embedded computer system 410 known to those in the relevant art. Typically, the program of the arrangement is resident in memory 418, and is read and controlled in its execution by the processor 414.

Figure 6:
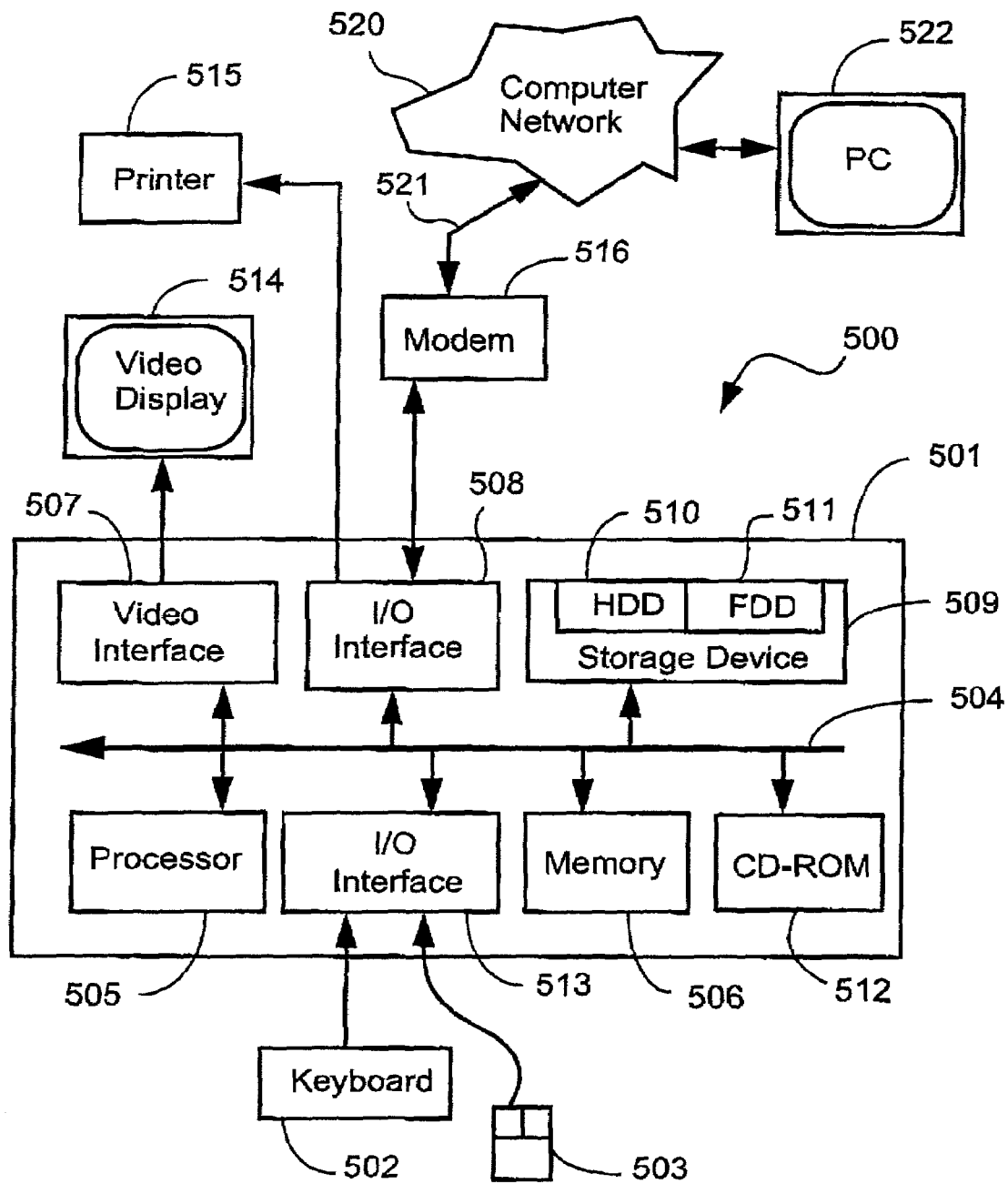
FIG. 6 is a general purpose computer upon which an arrangement of the improved SAX parser can be practiced.

The method of parsing a markup language document can also be practiced using a conventional general-purpose computer system 500, such as that shown in FIG. 6 wherein the processes of FIGS. 3(*a*), 3(*b*), 3(*c*), and 4 may be implemented as software, such as an application program executing within the computer system 500. This application is useful, for example, when hashing is used as a communication standard across a network between computers. FIG. 6 shows only one of the communicating computers being considered.

In particular, the steps of the method of parsing a markup language document are effected by instructions in the software that are carried out by the computer. The software may be divided into two separate parts, namely one part for carrying out the parsing methods, and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for parsing a markup language document in accordance with the embodiments of the invention.

The computer system 500 comprises a computer module 501, input devices such as a keyboard 502 and mouse 503, output devices including a printer 515 and a display device 514. A Modulator-Demodulator (Modem) transceiver device 516 is used by the computer module 501 for communicating to and from a communications network 520, for example connectable via a telephone line 521 or other functional medium. The modem 516 can be used to obtain access to the Internet, other network systems, such as a Local Area Network (LAN) or a Wide Area Network (WAN), and the other personal computer (PC) 522 with which the computer 500 is communicating.

The computer module 501 typically includes at least one processor unit 505, a memory unit 506, for example formed from semiconductor random access memory (RAM) and read only memory (ROM), input/output (I/O) interfaces including a video interface 507, and an I/O interface 513 for the keyboard 502 and mouse 503 and optionally a joystick (not illustrated), and an interface 508 for the modem 516.

A storage device 509 is provided and typically includes a hard disk drive 510 and a floppy disk drive 511. A magnetic tape drive (not illustrated) may also be used. A CD-ROM drive 512 is typically provided as a non-volatile source of data. The components 505 to 513 of the computer module 501, typically communicate via an interconnected bus 504 and in a manner which results in a conventional mode of operation of the computer system 500 known to those in the relevant art. Examples of computers on which the embodiments can be practised include IBM-PC's and compatibles, Sun Sparcstations or alike computer systems evolved therefrom.

Typically, the application program of the embodiment is resident on the hard disk drive 510, and is read and controlled in its execution by the processor 505. Intermediate storage of the program and any data fetched from the network 520 may be accomplished using the semiconductor memory 506, possibly in concert with the hard disk drive 510. In some instances, the application program may be supplied to the user encoded on a CD-ROM or floppy disk and read via the corresponding drive 512 or 511, or alternatively may be read by the user from the PC 522 over the network 520 via the modem device 516.

Still further, the software can also be loaded into the computer system 500 from other computer readable medium including magnetic tape, a ROM or integrated circuit, a magneto-optical disk, a radio or infra-red transmission channel between the computer module 501 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

INDUSTRIAL APPLICABILITY

It is apparent from the above that the embodiment(s) of the invention are applicable to the computer and data processing industries.

The foregoing describes only some embodiments of the present invention, and modifications and/or changes can be made thereto without departing from the scope and spirit of the invention, the embodiments being illustrative and not restrictive.

The invention claimed is:

1. A method of generating an encoded representation of a markup language document comprising syntactic elements, said method comprising the steps of:
   parsing the markup language document to identify at least one syntactic element of that document;
   identifying a type of the element;
   processing the element by applying a hash function thereto, the hash function generating a numeric code from the element; and
   generating the encoded representation including the numeric code;
   wherein first and second syntactic elements respectively comprise a start tag and an end tag, being a first pair of tags, and said processing of said start tag and of said end tag generates corresponding hashed start and end tags;
   wherein corresponding hashed start and end tags for the first pair of tags are incorporated into the encoded representation of the document;
   wherein the document further includes a second pair of tags comprising respective start and end tags, the second pair of tags being nested within the first pair of tags in the document, and
   said method comprising further steps of:
   processing the second pair of tags to form corresponding second hashed start and end tags; and
   augmenting the encoded representation of the document using the corresponding second hashed start and end tags so that the second hashed start and end tags indicate a nesting in relation to the hashed start and end tags for the first pair of tags which is equivalent to the nesting of the second pair of tags within the first pair of tags.

2. A method according to claim 1, wherein the parsing is event-based parsing.

3. A method according to claim 1, wherein the numeric code is determined using one of:
   a hash algorithm;
   a first reference to the hash algorithm dependent upon an associated Universal Reference Indicator;
   a second reference to the hash algorithm dependent upon an associated namespace; and
   a third reference to the hash algorithm dependent upon an associated Extended Markup Language declaration.

4. A method according to claim 1, wherein the element type is one of:
   one of a structural element and a part thereof;
   a definition of the structural element;
   a declaration of the structural element; and
   a match for the structural element.

5. A method according to claim 4, wherein the structural element is a tag.

6. A method according to claim 1, wherein the numeric code is a unique code for the one syntactic element, the element having less than a first number of characters.

7. A method according to claim 1, wherein the hash function is not guaranteed to produce a unique numeric code for the one syntactic element, in situations where the element is constrained, to a probability level, in terms of at least one of (i) a number of characters in the element and (ii) a permissible number of permutations of characters in the element.

8. A method according to claim 1 comprising, for another one of the syntactic elements, the further steps of:
   identifying a type of the other element;
   processing the other element by applying the hash function thereto, thereby to generate a second numeric code from the other element; and
   augmenting the enclosed representation of the markup language document using the second numeric code,
   wherein said processing of the one element and said processing of the other element ensure that if a first relationship exists between the one element and the other element, then a second relationship which is representative of the first relationship, exists between the numeric code of the one element and the second numeric code of the other element.

9. A method according to claim 8, wherein:
   the one element is a start tag;
   the other element is an end tag;
   the numeric code of the one element is a corresponding hashed start tag, and the second numeric code of the other element is a corresponding hashed end tag.

10. A method according to claim 9, wherein:
    the end tag is a first modification of the start tag; and
    the hashed end tag is a second modification of the hashed start tag, the second modification being representative of the first modification.

11. A method according to claim 10, wherein:
    the end tag is the same as the start tag apart from having a distinguishing character incorporated therein; and
    the hashed end tag is at least one of:
    the same as the hashed start tag;
    the same as the hashed start tag apart from having a distinguishing character incorporated therein; and the hashed start tag having been processed by an operator.

12. A method according to claim 1 comprising, prior to said augmenting step, a further step of:
concatenating the first hashed start tag with the second hashed start tag, and concatenating the first hashed end tag with the second hashed end tag, to thereby form respective extended hashed start and end tags for said second pair,
wherein said augmenting step is performed using the respective extended hashed start and end tags for the second pair, and
the extended hashed start and end tags indicate a nesting in relation to the hashed start and end tags for the first pair of tags which is equivalent to the nesting of the second pair of tags within the first pair of tags.

13. A method according to claim 1, comprising a further step of:
checking the well-formedness of the encoded representation of the document against a syntactic rule.

14. A method according to claim 13, wherein said well-formedness checking step comprising checking the markup language document against the syntactic rule by numerically comparing corresponding numeric code of elements in the encoded representation of the markup language document.

15. A method according to claim 14, wherein said numerically comparing step is succeeded by a further step of:
string-comparing, in accordance with the syntactic rule, corresponding non-processed representations of non-tag elements.

16. A method according to claim 14, wherein the syntactic rule relates to proper nesting of tags and said checking step comprises sub-steps of:
performing a numerical comparison across hashed tags in the encoded representation of the document, thereby to identify the first hashed start and end tags and the second hashed start and end tags; and
verifying that the second hashed start and end tags indicate a proper nesting in relation to the first hashed start and end tags.

17. A method according to claim 16, wherein the numerical comparison is followed by a further step of:
performing a string comparison, in accordance with the syntactic rule, across non-processed parts of respective tags in the encoded representation of the document.

18. A method according to claim 14, wherein said well-formedness checking step is one of (a) succeeded by, (b) included in, and (c) replaced by a validation step against a validation reference document VRD, said validation step comprising sub-steps of:
(a) processing the VRD, said processing comprising, for a syntactic element in the VRD, sub-sub-steps of:
(i) identifying a type of the syntactic element of the VRD; and
(ii) processing the syntactic element by applying a hash function thereto if the type is the first type, the hash function generating a numeric code from the element; and
(b) checking the encoded representation of the markup language document against the processed VRD, said checking comprising a sub-sub-step of numerically comparing corresponding numeric codes of the elements.

19. A method according to claim 1, further comprising the step of validating the markup language document against a validation reference document (VRD), said validating comprising sub-steps of:
(a) processing the markup language document, for each document tag identified therein, if the document tag is not a first document tag in a corresponding markup language document tag hierarchy, said processing comprising the sub-sub-steps of:
(i) determining a hierarchy position of the document tag;
(ii) determining an extended numeric code of the document tag concatenated with a numeric code of a previous document tag in the document tag hierarchy; and
(iii) storing the extended numeric code of the document tag if the document tag is more deeply nested than a previous document tag;
(b) processing the VRD, for each tag identified therein, if the tag is not a first tag in a corresponding tag hierarchy, said processing comprising sub-sub-steps of:
(i) determining a hierarchy position of the tag;
(ii) determining an extended numeric code of the tag concatenated with a numeric code of a previous tag in the corresponding tag hierarchy; and
(iii) storing the extended numeric code of the tag in a list; and
(c) validating the markup language document if the extended numeric code of the document tag is one of found in the list and is a valid subset of a member of the list.

20. A method according to claim 1, further comprising the step of determining a compressed representation of the syntactic element if the type is not a first type of element.

21. An apparatus for generating an encoded representation of a markup language document comprising syntactic elements, said apparatus comprising:
parsing means for parsing the markup language document to identify at least one syntactic element of that document;
identifying means for identifying a type of the element;
processing means for processing the element by applying a hash function thereto, said hash function generating a numeric code from the element; and
generating means for generating the encoded representation including the numeric code,
wherein first and second syntactic elements respectively comprise a start tag and an end tag, being a first pair of tags and said processing of said start tan and of said end tag generates corresponding hashed start and end tags;
wherein corresponding hashed start and end tags for the first pair of tags are incorporated into the encoded representation of the document;
wherein the document further includes a second pair of tans comprising respective start and end tags, the second pair of tags being nested within the first pair of tags in the document;
wherein said processing means processes the second pair of tags to form corresponding second hashed start and end tags; and
wherein said generating means augments the encoded representation of the document using the corresponding second hashed start and end tags so that the second hashed start and end tags indicate a nesting in relation to the hashed start and end tags for the first pair of tags which is equivalent to the nesting of the second pair of tans within the first pair of tags.

22. An apparatus according to claim 21, wherein each of said means forms a part of an embedded computer system.

23. A computer-executable program which is stored on a computer-readable storage medium and which is configured to make a computer execute a procedure to generate an encoded representation of a markup language document comprising syntactic elements, said program comprising:
code for parsing the markup language document to identify at least one syntactic element of that document;

code for identifying a type of the identified element;
code for processing the identified element by applying a hash function thereto, the hash function generating a numeric code from the identified element; and
code for generating the encoded representation including the numeric code,
wherein first and second syntactic elements respectively comprise a start tag and an end tag, being a first pair of tags, and said code for processing of said start tag and of said end tag generates corresponding hashed start and end tags;
wherein corresponding hashed start and end tags for the first pair of tans are incorporated into the encoded representation of the document;
wherein the document further includes a second pair of tags comprising respective start and end tags, the second pair of tags being nested within the first pair of tags in the document;
wherein said code for Processing processes the second pair of tans to form corresponding second hashed start and end tags; and
wherein said code for generating augments the encoded representation of the document using the corresponding second hashed start and end tags so that the second hashed start and end tags indicate a nesting in relation to the hashed start and end tags for the first pair of tags which is equivalent to the nesting of the second pair of tags within the first pair of tags.

24. A computer program product including a computer readable storage medium having encoded thereon a computer program which is configured to make a computer execute a procedure to generate an encoded representation of a markup language document comprising syntactic elements, said program comprising:
code for parsing the markup language document to identify at least one syntactic element of that document;
code for identifying a type of the element;
code for processing the element by applying a hash function thereto, the hash function generating a numeric code from the element; and
code for generating the encoded representation including the numeric code,
wherein first and second syntactic elements respectively comprise a start tag and an end tag, being a first pair of tags, and said code for processing of said start tag and of said end tag generates corresponding hashed start and end tags;
wherein corresponding hashed start and end tags for the first pair of tags are incorporated into the encoded representation of the document;
wherein the document further includes a second pair of tags comprising respective start and end tags, the second pair of tags being nested within the first pair of tans in the document;
wherein said code for processing processes the second pair of tags to form corresponding second hashed start and end tags; and
wherein said code for generating augments the encoded representation of the document using the corresponding second hashed start and end tags so that the second hashed start and end tags indicate a nesting in relation to the hashed start and end tags for the first pair of tags which is equivalent to the nesting of the second pair of tags within the first pair of tags.

25. An encoded representation of a markup language document comprising syntactic elements, the encoded representation having been produced by a method comprising:
parsing the markup language document to identify at least one the syntactic element of that document;
identifying a type of the element;
processing the element by applying a hash function thereto, the hash function generating a numeric code from the element; and
generating the encoded representation including said numeric code,
wherein first and second syntactic elements respectively comprise a start tag and an end tag, being a first pair of tags, and said processing of said start tag and of said end tag generates corresponding hashed start and end tags;
wherein corresponding hashed start and end tags for the first pair of tans are incorporated into the encoded representation of the document;
wherein the document further includes a second pair of tans comprising respective start and end tags, the second pair of tags being nested within the first pair of tags in the document, and
said method comprising further steps of:
processing the second pair of tans to form corresponding second hashed start and end tags; and
augmenting the encoded representation of the document using the corresponding second hashed start and end tags so that the second hashed start and end tags indicate a nesting in relation to the hashed start and end tags for the first pair of tags which is equivalent to the nesting of the second pair of tags within the first pair of tags.

26. An apparatus for generating an encoded representation of a markup language document comprising syntactic elements, said apparatus comprising:
a processor;
a memory for storing (i) the document, and (ii) a program which is configured to make the processor execute a procedure to generate the encoded representation,
wherein said program comprises:
code for parsing the markup language document to identify at least one syntactic element of that document;
code for identifying a type of the element;
code for processing the element by applying a hash function thereto, the hash function generating a numeric code from the element; and
code for generating the encoded representation including said numeric code,
wherein first and second syntactic elements respectively comprise a start tag and an end tag, being a first pair of tags, and said code for processing of said start tag and of said end tag generates corresponding hashed start and end tags;
wherein corresponding hashed start and end tags for the first pair of tags are incorporated into the encoded representation of the document;
wherein the document further includes a second pair of tags comprising respective start and end tags, the second pair of tags being nested within the first pair of tags in the document;
wherein said code for processing processes the second pair of tags to form corresponding second hashed start and end tags; and
wherein said code for generating augments the encoded representation of the document using the corresponding second hashed start and end tans so that the second hashed start and end tags indicate a nesting in relation to the hashed start and end tags for the first pair of tags which is equivalent to the nesting of the second pair of tags within the first pair of tags.

* * * * *

UNITED STATES PATENT AND TRADEMARK OFFICE
CERTIFICATE OF CORRECTION

| | |
|---|---|
| PATENT NO. | : 7,281,205 B2 |
| APPLICATION NO. | : 09/893645 |
| DATED | : October 9, 2007 |
| INVENTOR(S) | : John Charles Brook |

It is certified that error appears in the above-identified patent and that said Letters Patent is hereby corrected as shown below:

COLUMN 4

Line 53, "list thereby" should read --list, thereby--.

COLUMN 8

Line 18, "representation" should read --representation of--.

COLUMN 9

Line 42, "bashed" should read --hashed--.

COLUMN 14

Line 52, "steps 300," should read --steps 300--.

COLUMN 16

Line 22, "FIG. 3(c)" should read --FIG. 3(c),--.

COLUMN 20

Line 15, "an" should read --a--; and
Line 46, "providing" should read --provided--.

COLUMN 21

Line 45, "bash" should read --hashed--.

COLUMN 22

Line 41, "process ie" should read --process, i.e.,--.

COLUMN 26

Line 54, "and the" should read --and ¶ the--.

UNITED STATES PATENT AND TRADEMARK OFFICE
CERTIFICATE OF CORRECTION

PATENT NO. : 7,281,205 B2
APPLICATION NO. : 09/893645
DATED : October 9, 2007
INVENTOR(S) : John Charles Brook It is certified that error appears in the above-identified patent and that said Letters Patent is hereby corrected as shown below:

COLUMN 28

Line 46, "tans" should read --tags--; and
    Line 58, "tans" should read --tags--.

COLUMN 29

Line 12, "tans" should read --tags--;
    Line 18, "Processing" should read --processing--;
    Line 19, "tans" should read --tags--;
    Line 52, "tans" should read --tags--; and
    Line 67, "one the" should read --one--.

COLUMN 30

Line 12, "tans" should read --tags--;
    Line 15, "tans" should read --tags--;
    Line 19, "tans" should read --tags--; and
    Line 61, "tans" should read --tags--.

Signed and Sealed this

Eighth Day of April, 2008

JON W. DUDAS
*Director of the United States Patent and Trademark Office*